US012786785B2

(12) United States Patent
Whdan

(10) Patent No.: US 12,786,785 B2
(45) Date of Patent: Nov. 3, 2026

(54) TRANSMISSION CAPACITY AND CONGESTION DETECTION FOR OPEN RADIO ACCESS NETWORKS

(71) Applicant: DISH Wireless L.L.C., Englewood, CO (US)

(72) Inventor: Ahmed Awwad Whdan, Centennial, CO (US)

(73) Assignee: DISH Wireless L.L.C., Englewood, CO (US)

( * ) Notice: Subject to any disclaimer, the term of this patent is extended or adjusted under 35 U.S.C. 154(b) by 399 days.

(21) Appl. No.: 18/400,910

(22) Filed: Dec. 29, 2023

(65) Prior Publication Data

US 2025/0220501 A1 Jul. 3, 2025

(51) Int. Cl.

| | |
|---|---|
| ***H04W 28/02*** | (2009.01) |
| ***H04W 16/22*** | (2009.01) |
| ***H04W 24/08*** | (2009.01) |
| ***H04W 24/10*** | (2009.01) |

(52) U.S. Cl.

CPC ....... *H04W 28/0284* (2013.01); *H04W 16/22* (2013.01); *H04W 24/08* (2013.01); *H04W 24/10* (2013.01)

(58) Field of Classification Search

None

See application file for complete search history.

(56) References Cited

U.S. PATENT DOCUMENTS

| | | | | |
|---|---|---|---|---|
| 11,082,862 | B1 * | 8/2021 | Thakur | G06T 7/30 |
| 2005/0135313 | A1 * | 6/2005 | Gandhi | H04W 16/18 370/335 |
| 2020/0015046 | A1 * | 1/2020 | Wong | H04W 24/10 |
| 2021/0250245 | A1 * | 8/2021 | Li | H04L 41/0823 |
| 2024/0259868 | A1 * | 8/2024 | Agrawal | H04L 47/83 |

* cited by examiner

*Primary Examiner* — Brian S Roberts

(74) *Attorney, Agent, or Firm* — KW Law, LLP

(57) ABSTRACT

An example process may detect capacity breaches in an area of interest (AOI) of an open radio access network (RAN). Data is queried for cells in the RAN network over a sampling period to retrieve hourly-traffic data for the cells. Outliers may be removed from the hourly-traffic data for the cells. In the trimmed hourly-traffic data, top-download-traffic hours are identified on different days in the sampling period for each of the cells. The example process may include aggregating the trimmed hourly-traffic data for each of the cells at the top-download-traffic hours to generate busy-hour indicators for each of the cells and busy-hour indicators for sectors associated with cells. The busy-hour indicators may be extrapolated using subscriber growth in the AOI to generate forecast indicators for each of the cells and for the sectors associated with the cells. The forecast indicators are compared to capacity thresholds to forecast capacity breaches.

18 Claims, 26 Drawing Sheets

400

| OUTPUT MODULE RAN-1 | | | | |
|---|---|---|---|---|
| | Q1 | Q2 | Q3 | Q4 |
| 0 | #SECTORS BREAK | #SECTORS BREAK | #SECTORS BREAK | #SECTORS BREAK |
| 1 | LIST OF SECTORS AND BREACH TYPE | LIST OF SECTORS AND BREACH TYPE | LIST OF SECTORS AND BREACH TYPE | LIST OF SECTORS AND BREACH TYPE |
| 2 | LIST OF P&C SITES REQUIRED | LIST OF P&C SITES REQUIRED | LIST OF P&C SITES REQUIRED | LIST OF P&C SITES REQUIRED |

| OUTPUT MODULE TR-1 | | | | |
|---|---|---|---|---|
| | Q1 | Q2 | Q3 | Q4 |
| 0 | #FH NEW LINKS REQUIRED | #FH NEW LINKS REQUIRED | #FH NEW LINKS REQUIRED | #FH NEW LINKS REQUIRED |
| 1 | #FH EXPANSION LINKS REQUIRED | #FH EXPANSION LINKS REQUIRED | #FH EXPANSION LINKS REQUIRED | #FH EXPANSION LINKS REQUIRED |

1000

| OUTPUT MODULE RAN-2 | | | | |
|---|---|---|---|---|
| | Q1 | Q2 | Q3 | Q4 |
| 0 | #ADDITIONAL DU SERVERS REQUIRED | #ADDITIONAL DU SERVERS REQUIRED | #ADDITIONAL DU SERVERS REQUIRED | #ADDITIONAL DU SERVERS REQUIRED |
| 1 | #FH EXPANSION LINKS REQUIRED | #FH EXPANSION LINKS REQUIRED | #FH EXPANSION LINKS REQUIRED | #FH EXPANSION LINKS REQUIRED |

| OUTPUT MODULE TR-1 | | | | |
|---|---|---|---|---|
| | Q1 | Q2 | Q3 | Q4 |
| 0 | #MH NEW LINKS REQUIRED | #MH NEW LINKS REQUIRED | #MH NEW LINKS REQUIRED | #MH NEW LINKS REQUIRED |
| 1 | #MH EXPANSION LINKS REQUIRED | #MH EXPANSION LINKS REQUIRED | #MH EXPANSION LINKS REQUIRED | #MH EXPANSION LINKS REQUIRED |

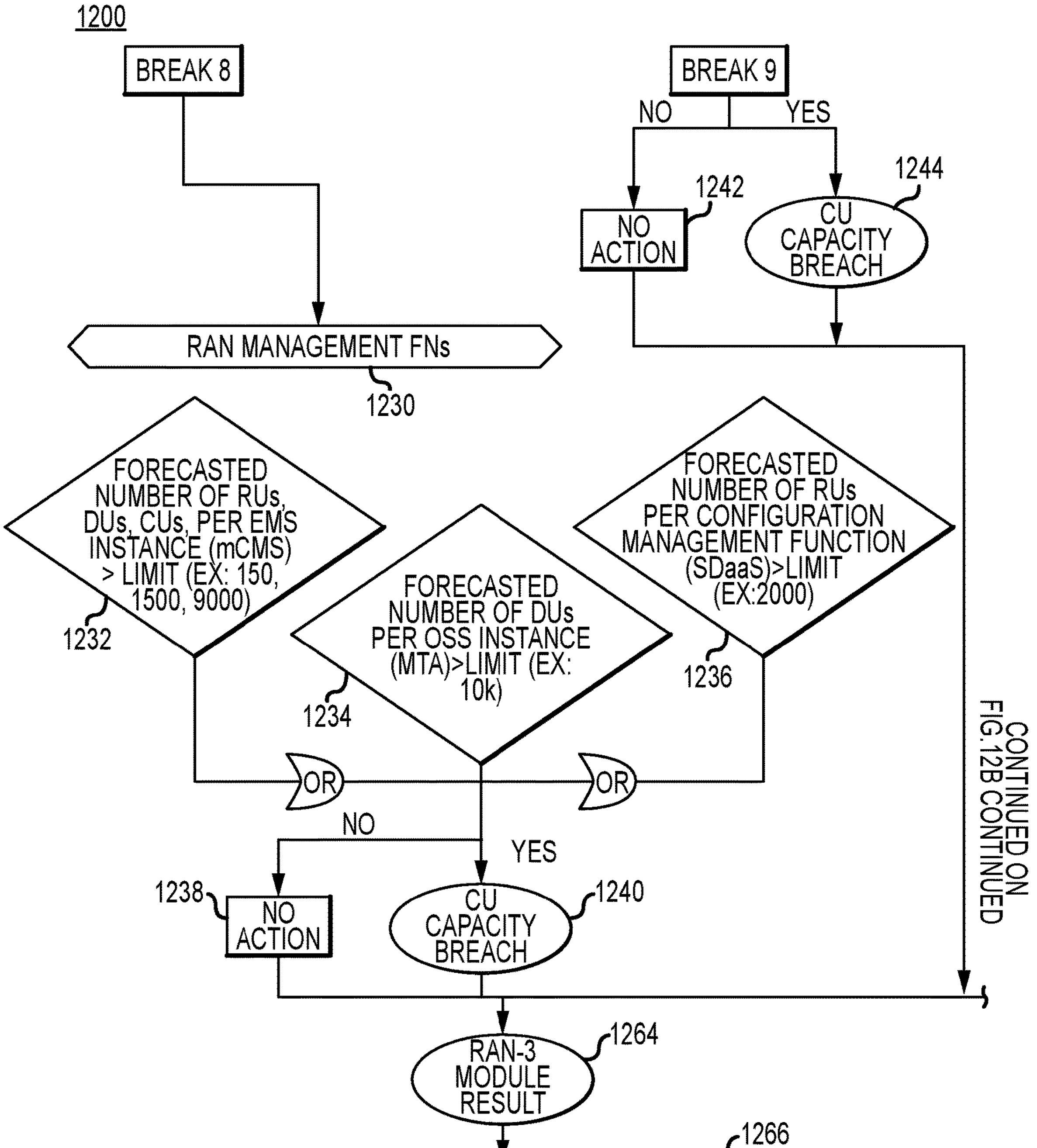

| OUTPUT MODULE RAN-3 | | | | |
|---|---|---|---|---|
| | Q1 | Q2 | Q3 | Q4 |
| 0 | #CU-UP AND CU-CP BREACHING THE CAPACITY LIMITS | #CU-UP AND CU-CP BREACHING THE CAPACITY LIMITS | #CU-UP AND CU-CP BREACHING THE CAPABILITY LIMITS | #CU-UP AND CU-CP BREACHING THE CAPABILITY LIMITS |
| 1 | #K8s CLUSTER BREACHING DIMENSIONING LIMITS | #K8s CLUSTER BREACHING DIMENSIONING LIMITS | #K8s CLUSTER BREACHING DIMENSIONING LIMITS | #K8s CLUSTER BREACHING DIMENSIONING LIMITS |

FIG.12B

TRANSMISSION CAPACITY AND CONGESTION DETECTION FOR OPEN RADIO ACCESS NETWORKS

TECHNICAL FIELD

The following discussion generally relates to data and telephone networks, and in particular to capacity and congestion management on data and telephone networks.

BACKGROUND

Wireless networks face challenges in efficiently managing resources, accommodating varying traffic loads, and preemptively detecting and mitigating current and future congestion points. These challenges are amplified in rapidly-growing service areas, as new devices and accounts come online. As the number of subscribers on a network increases, traffic increases on the network. Network resources begin to reach capacity, and traffic and users exceeding network capacity tend to experience poor response times, lower download and upload speeds, admission rejections, dropped calls, and other inconveniences symptomatic of an overburdened radio access network. Congestion detection and anticipation tools may be insufficient to respond to evolving network conditions in a service region. Similarly, existing congestion detection mechanisms may lack the necessary sophistication to provide timely insights into evolving network conditions. Without the ability to detect congestion and anticipate future network needs, dropped calls, slow response times, and suboptimal user experiences can become more frequent as networks grow.

Furthermore, techniques that might be suitable for traditional RAN networks may be insufficient for cloud-based data and telephone networks. Cloud-based networks rely on different infrastructure than traditional data and telephone networks. Network shortcomings and congestion in a cloud-based network may manifest from different technical needs due to the different supporting infrastructure.

SUMMARY

Various embodiments detect capacity breaches in an area of interest (AOI) of a radio access network (RAN). An example process may query data for cells in the RAN network over a sampling period to retrieve hourly-traffic data for the cells. Outliers may be removed from the hourly-traffic data for the cells to generate trimmed hourly-traffic data for the cells. In the trimmed hourly-traffic data, top-download-traffic hours are identified on different days in the sampling period for each of the cells. The example process may include aggregating the trimmed hourly-traffic data for each of the cells at the top-download-traffic hours to generate busy-hour indicators for each of the cells and busy-hour indicators for sectors associated with cells. The busy-hour indicators may be extrapolated using subscriber growth in the AOI to generate forecast indicators for each of the cells and for the sectors associated with the cells. The forecast indicators are compared to capacity thresholds to forecast capacity breaches.

Various embodiments may identify a new cell site for construction in the AOI in response to forecasting a sector capacity breach. A throughput capacity of a fronthaul link from a location of the new cell site towards a data center may be identified in response to identifying the new cell site for construction, and a fronthaul capacity breach may be forecast in response to the throughput capacity of the fronthaul link from the location of the new cell site towards the data center being less than a throughput capacity of a virtual distributed unit at the data center. A link may be identified for expansion in response to forecasting the fronthaul capacity breach. A throughput capacity of a physical link at a live cell site may be identified in response to forecasting a capacity breach at the live cell site, and a fronthaul capacity breach may be forecast in response to the throughput capacity of the physical link being less than a throughput capacity of a distributed unit.

Various examples may include identifying a new link for construction in response to forecasting the fronthaul capacity breach. A transmission bandwidth of a mid-haul link may be identified in response to forecasting a capacity breach at a live cell site, and a mid-haul capacity breach may be forecast in response to the transmission bandwidth of the mid-haul link being greater than a throughput capacity of a distributed unit. An expansion of the mid-haul link may be identified in response to forecasting the mid-haul capacity breach. An interface rate of a mid-haul link is identified in response to forecasting a capacity breach at a live cell site, and a mid-haul capacity breach is forecast in response to the interface rate of the mid-haul link being less than a throughput capacity of a distributed unit. Examples may include identifying an interface expansion of the mid-haul link in response to forecasting the mid-haul capacity breach.

In various embodiments, a traffic between a virtual distributed unit (vDU) running at a first data center and a virtual central unit (vCU) running at a second data center may be forecast in response to forecasting a capacity breach at a live cell site or at a planned cell site, and a mid-haul capacity breach may be forecast in response to the traffic between the vDU and the vCU being greater a mid-haul capacity. An expansion of a mid-haul link between the first data center and the second data center may be identified in response to forecasting the mid-haul capacity breach. Example processes may include aggregating the trimmed hourly-traffic data for each of the cells at the top-download-traffic hours by averaging the trimmed hourly-traffic data for each of the cells at the top-download-traffic hours.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

Figure 1:
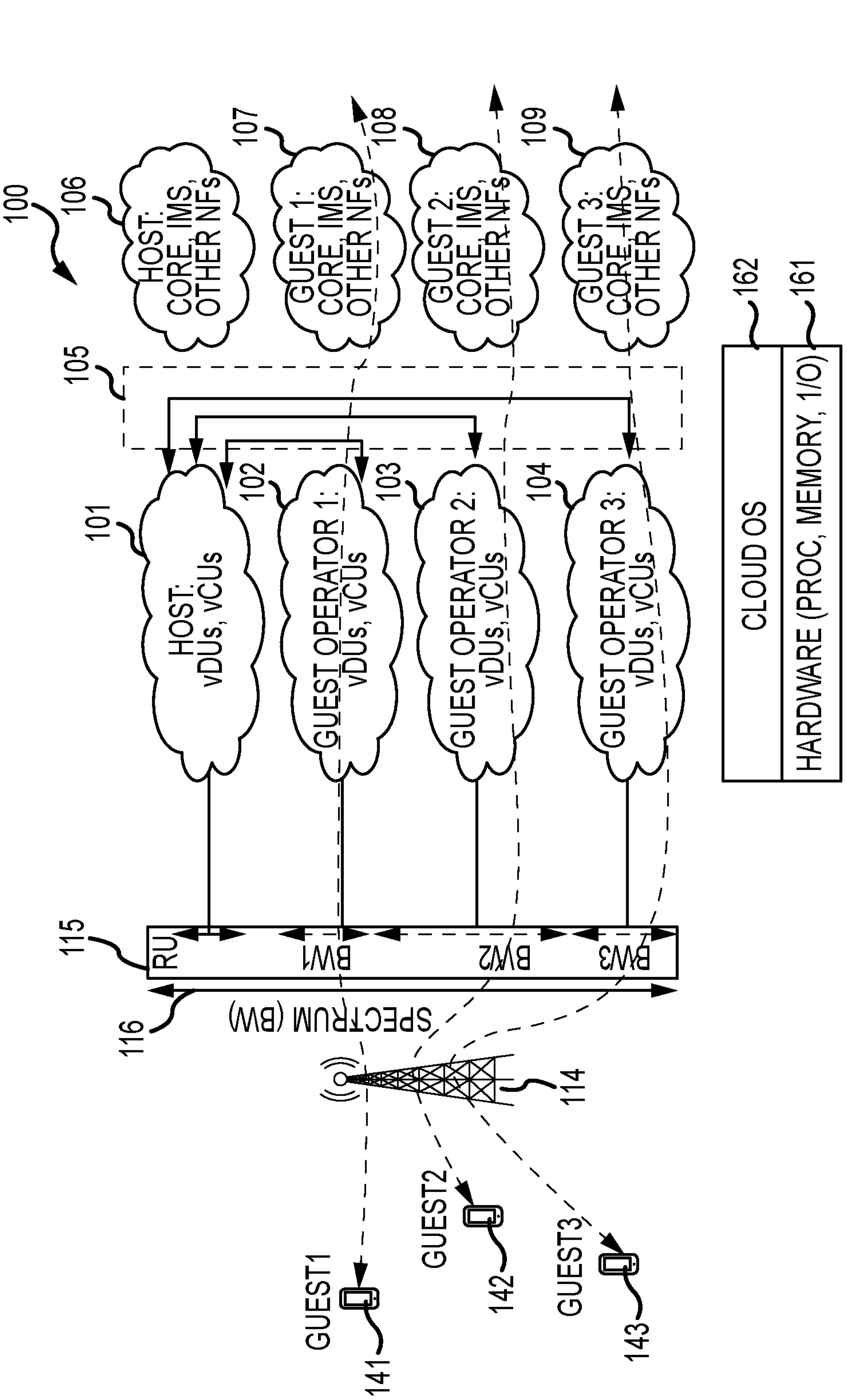
FIG. 1 illustrates an example of a cloud-based wireless network using virtualized network functions, in accordance with various embodiments.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Systems, methods, and devices (collectively, the System) of the present disclosure detect likely capacity overruns and congestion in cloud-based data and telephone networks. Network data is collected from network infrastructure, both physical and virtualized, for a sampling period and used to analyze network behavior. Subscriber growth is modeled and used as an input along with the network data to accurately project likely capacity breaches as more subscribers come onto the data and telephone network. Capacity needs can be projected in time segments (e.g., monthly, quarterly, or annually) to allocate resources efficiently while supporting network growth.

The System can identify solutions to likely capacity limitations and congestion at different infrastructure levels of the data and telephone network to avoid identified capacity overruns and congestion. While some cloud-based solutions might support scaling cloud-based resources in real time or near-real time, antennas and other infrastructure located at cell sites can take significant lead times (e.g., months or years) before becoming operational.

The System tends to alleviate congestion on a virtualized and cloud-based Radio Access Network (RAN), and thereby reduce the impact of congestion on customer experience. The System of the present disclosure forecasts network congestion in advance and identifies the exact resources that are likely to exceed capacity limits of the network. By forecasting congestion and identifying the exact resources that will exceed limits, network operators can proactively expand capacity, optimize parameters, add sites, split sectors, or otherwise remove future performance bottlenecks.

Traditionally, data and telephone networks relied upon proprietary designs based upon very specialized hardware and dedicated point-to-point data connections. More recently, industry standards such as the Open Radio Access Network (Open RAN or O-RAN) standard have been developed to describe interactions between the network and various client devices. The O-RAN model follows a virtualized wireless architecture in which 5G base stations (gNBs) are implemented using separate centralized units (CUs), distributed units (DUs), and radio units (RUs), along with various control planes that provide additional network functions (e.g., 5G Core, IMS, and operational support systems (OSS)/business support systems (BSS)). Generally speaking, it is still necessary to implement the RUs with physical transmitters, antennas, and other hardware located at cell sites within broadcast range of the end user's device.

Other components of the network, however, can be implemented using a more centralized architecture based upon cloud-based computing resources, such as those available from Amazon® Web Services (AWS) or the like. This provides much better network management, scalability, reliability, and redundancy, as well as other benefits. O-RAN, CUs, DUs, control planes, and/or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane, or other image is created in software for execution by one or more virtual computers operating in parallel within the cloud environment.

One challenge that does arise, however, involves infrastructure needs in a rapidly changing network. New subscribers come online daily, which can increase infrastructure demands to support the expected quality of network services. The many changes to hardware interfaces, communication bandwidth infrastructure, and virtual servers in a cloud-based data and telephone network, along with their associated costs and time constraints for implementation, can be planned on a longer time horizon to enable efficient management of a data and telephone network while maintaining the quality of service.

With reference now to FIG. 1, an example cellular communication network 100 is shown having virtualized network functions, in accordance with various embodiments. As used herein, the term network function may describe a functional building block within a network infrastructure. Network functions typically include well-defined external interfaces and a well-defined functional behavior. Network functions may be implemented in a cloud-based environment using virtualization tools such as, for example, virtual machines or containers. The systems described herein may thus spool up or retire network functions by launching a new instance or killing an existing instance of the network function.

In various embodiments, cellular communication network 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators, though the systems, methods, and devices described herein could be applied to any wireless network using virtualized network services. Examples of guest network operators may include internal brands of the host operator, system integrators, enterprises, external mobile virtual network operators (MVNOs), or converged operators. The host and the guest network operators may maintain desired network services to support user equipment (UE) 141, 142, 143 (also referred to herein as user devices). The techniques described herein can be applied to host or guest networks as desired, as well as to any other type of cloud-based data and telephone network.

In the example of FIG. 1, each RU 115 communicates with UE 141, 142, 143 operating within a geographic area (e.g., a cell) using one or more antennas 114 (also referred to herein as towers) capable of transmitting and receiving messages within an assigned spectrum or bandwidth 116 of electromagnetic bandwidth. In various embodiments, guest networks 102, 103, 104 interact with a provisioning plane 105 to obtain desired spectrum (e.g., portions of bandwidth) across one or more of the RUs 115 operated by the host 101. Provisioning plane 105 allows guest network operators to obtain or change their assigned bandwidths on different RUs 115 on an on-demand and dynamic basis. Network services 107, 108, 109 may be maintained by guest operators and network services 106 may be maintained by host 101. The existing network infrastructure is sometimes overloaded during busy hours as additional subscribers come online, which can result in decreased quality of service.

The Open RAN standard breaks communications into three main domains: the RU that handles radio frequency (RF) and lower physical layer functions of the radio protocol stack, including beamforming; the DU that handles higher physical access layer, media access (MAC) layer and radio link control (RLC) functions; and the CU that performs higher level functions, including quality of service (QOS) routing and the like. The CU also supports packet data convergence protocol (PDCP), service data adaptation protocol (SDAP), and radio resource controller (RRC) functions. The RU, DU, and CU functions are described in more detail in the Open RAN standards, as updated from time to time, and may be modified as desired to implement the various functions and features described herein. In the example of FIG. 1, host 101 maintains one or more DUs and CUs (i.e., network functions) as part of its own network. The DU communicates with one or more RUs 115, as specified in the Open RAN standard.

The various network components shown in FIG. 1 and other computing devices described herein are typically implemented using software or firmware instructions that are stored in a non-transitory storage medium (e.g., a disk drive or solid-state memory) for execution by one or more processors. The processors or computing devices may perform operations in response to executing the instructions. The various components shown in FIG. 1 can be implemented using cloud-based hardware 161 and an appropriate operating system 162 such as the AWS platform, although other embodiments could use other cloud platforms or any type of conventional physical computing hardware 161, as desired. Examples of cloud platforms that could support network 100 include ServerSpace, Microsoft Azure, Google Cloud Platform, IBM Cloud Services, Kamatera, VMware, or any other cloud service provider. In that regard, components of network 100 may be implemented using network functions, containers, virtual machines, or other virtualized implementations suitable for a cloud-based network.

As illustrated in the example of FIG. 1, network 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual network functions using cloud resources.

Guest networks 102, 103, 104 operated by guest operators can manage their own networks using allocated portions of the bandwidth 116 handled by one or more of the RUs 115 associated with the host 101. The guest networks 102, 103, 104 communicate with one or more UEs 141-143 using allocated bandwidth 116 on the host's RU 115. Guest networks 102, 103, 104 may include one or more virtual DUs and CUs, as well as other network services 106, 107, 108, 109, as desired. Generally, one or more guest operators will instantiate its own 5G virtualized network functions (e.g., CMS, vCUs, vDUs, etc.) using cloud-based resources, as noted above. However, various embodiments may operate outside of cloud-based environments. Host network 101 may also generate its own network services to manage software and services available to UE 141-143.

Guest operators may lease or otherwise obtain any needed 5G access for its planned services, capacity, and coverage based on an arrangement with the host provider. A guest provider may then operate and manage its own 5G network 102, 103, 104 independently of the host 101 and the other guests. A network operator can optimize its own network by implementing its own cloud-based infrastructure, which can be maintained at adequate levels for the desired services levels using techniques described herein.

Each RU 115 is typically associated with a different wireless cell that provides wireless data communications to UE 141-143. RUs 115 may be implemented with radios, filters, amplifiers, and other telecommunications hardware to transmit digital data streams via one or more antennas 114. Generally, RU hardware includes one or more processors, non-transitory data storage (e.g., a hard drive or solid-state memory) and appropriate interfaces to perform the various functions described herein. RUs are physically located at cell sites with the antenna 114, as appropriate. Each antenna or cell site may have three sectors spanning an arc of approximately 120 degrees (or ⅓ of the area covered by a cell site), and each sector may have four cells for a total of twelve cells at each cell site. Capacity breaches can be site-based, cell based, or sector-based capacity breaches depending on the type of capacity projected to breach current infrastructure limits. Conventional 5G networks may make use of any number of wireless cell cites spread across any geographic area, each cell site with its own on-site RU 115.

RUs 115 support wireless communications with any number of UE 141-143. UE 141-143 are often mobile phones or other portable devices that can move between different cells associated with the different RUs 115, although 5G networks are also widely expected to support home and office computing, industrial computing, robotics, Internet-of-Things (IoT), and many other devices. While the example illustrated in FIG. 1 shows one RU 115 for convenience, a practical implementation will typically have any number of virtualized RUs 115 that can each be individually configured to provide highly configurable geographic coverage for a host or guest network, if desired. Host 101 (or guest operators 102, 103, 104) can use the techniques described herein to efficiently scale their networks based on forecast subscriber growth while maintaining quality of service.

Figure 2:
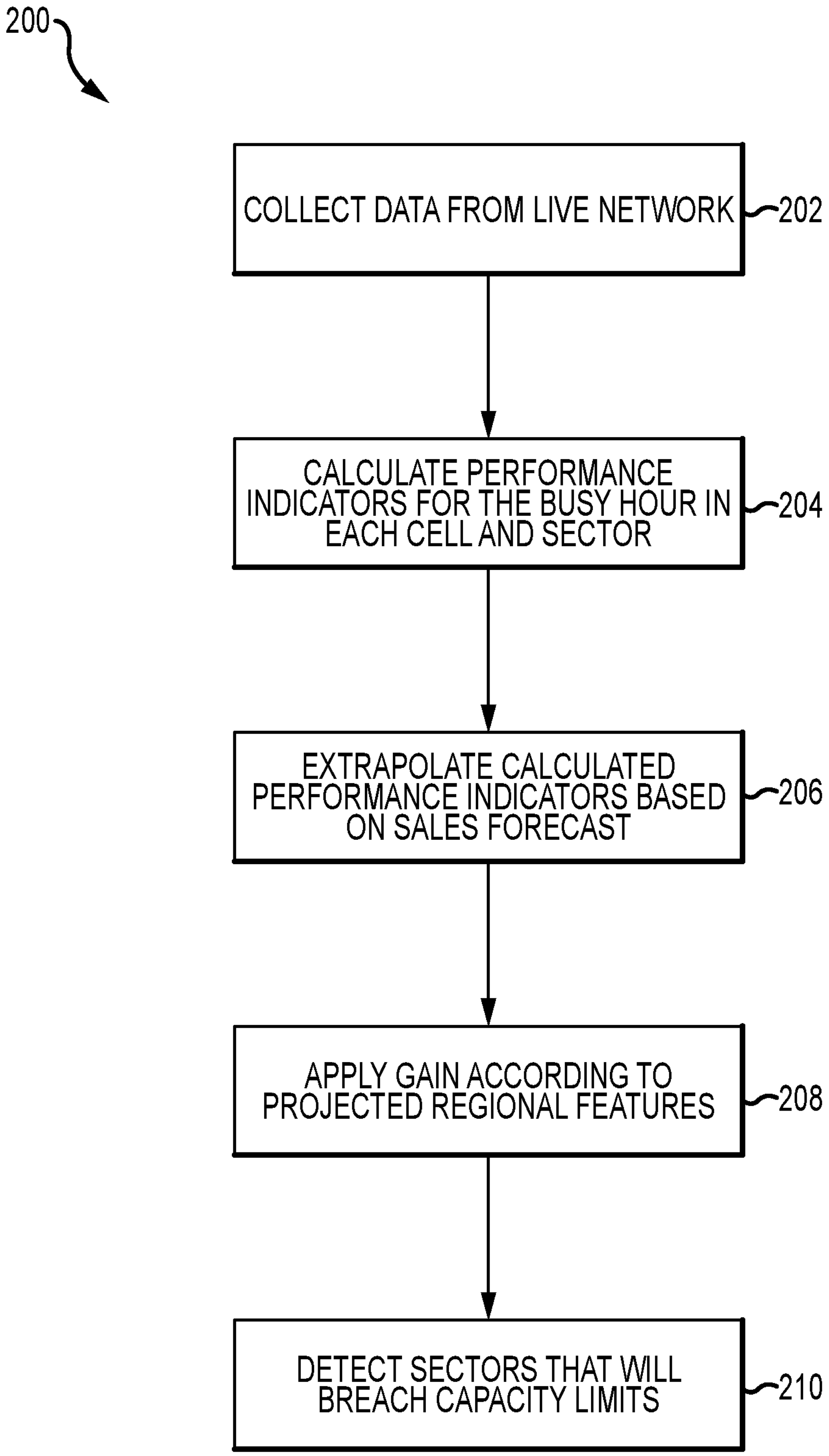
FIG. 2 illustrates an example process for detecting capacity breaches at cell sites and sectors of a wireless network for remediation, in accordance with various embodiments.

Referring now to FIG. 2, a process is shown for advanced detection of capacity breaches at cell sites and sectors for remediation, in accordance with various embodiments. The example process 200 of FIG. 2 is applied to a wireless network such as host network 101 (of FIG. 1). Process 200 may be executed on cloud-based hardware 161 (of FIG. 1), on standalone hardware in communication with the cloud-based data and telephone network, or on any other computing hardware.

In various embodiments, process 200 begins by collecting data from the live data and telephone network (Block 202). Data collection can be automated using data pipelines that move data collected at cell sites into data stores. Collected data may be related to RUs or other hardware or virtualized resources available at a cell site. Data of particular interest may include throughput metrics at various hardware of a cell site. Data can be collected continuously using a data pipeline or data stream to deliver cell site data into a data store. The data store can be an unstructured or structured data store. For example, records can be tagged and stored in a data lake available on AWS, though other storage schemes could be equivalently used. Records could also be delivered in JSON files and ingested into relational databases in another example.

Figure 3:
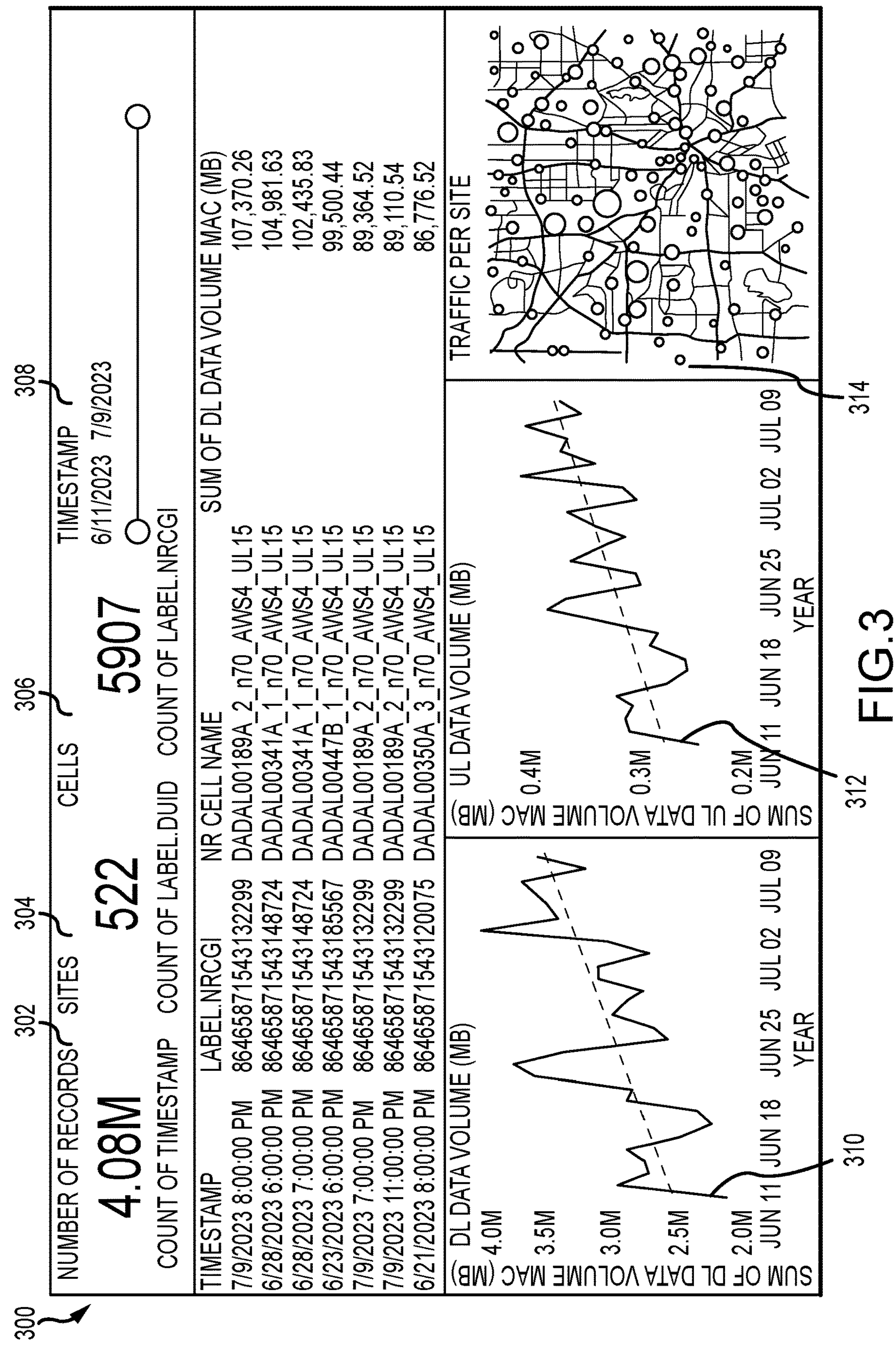
FIG. 3 illustrates an example data collection interface for a wireless network, in accordance with various embodiments.

With brief reference to FIG. 3, data from cell sites of the wireless network can be collected and reviewed using data collection interface 300. Relevant records can include, for example, timestamps, asset labels, cell name, download (DL) data volume for a Media Access Control (MAC), upload (UL) data volume for a MAC, DL Physical Resource Block (PRB) utilization, UL PRB utilization, or other data of interest. Metadata relevant to a cell site or region of interest might include number of records 302 in a result set, number of cell sites 304 contributing data, or number of cells 306 contributing data. Data sets can be filtered or limited using filters 308. Data of interest might include DL data volume 310, UL data volume 312, or traffic per site 314. Data can be collected and aggregated into time windows such as, for example, by the minute, hour, day, or any other period of interest based on the included timestamp of each record.

Returning now to FIG. 2, process 200 may include calculating performance indicators for the busy hours in each cell and sector (Block 204). The performance indicators may be calculated using the data collected from the data and telephone network in block 202. The busy hour data may be collected on different days. For example, a busy hour calculation for a sector may include identifying the busiest hours in each day of a sampling period and averaging the three busiest hours from the sampling period together. Examples of performance indicators can include dropped call rate, minimum realized data rate per device, maximum realized data rate per device, average data rate per device, capacity usage, and remaining capacity.

In various embodiments, the busy hour may be described as the hour where the network element is experiencing its highest traffic (e.g., data usage in Giga Bytes per cell or sector in a cell site) during the 24 hours in a day. For example, the busy hour with the highest traffic volume at a cell site may be when people tend to return home and use data (e.g., 6:00 p.m.). The busy hour may be calculated using the top 3 hours during a month, after removing the outliers (e.g., traffic spikes). Once the top 3 hours are identified, known performance indicators (KPIs) may be calculated for those hours. Examples of these capacity indicators or KPIs may include downlink traffic volume, uplink traffic volume, traffic volume in the physical layer, traffic volume in the radio link control (RLC) layer, number of active connected users to a cell, downlink and uplink data throughput in Mega bit per second, resource utilization of physical resources blocks (PRBs), utilization in uplink and downlink (e.g., percentages), or other suitable performance indicators for network hardware and cloud-based infrastructure. The foregoing KPIs tend to describe traffic levels, though other KPIs may be used to assess signaling performance. Examples of signal-oriented performance indicators may include demodulation reference signal (DMRS) utilization percentage, physical downlink control channel (PDCCH) utilization percentage, physical uplink control channel (PUCCH) utilization percentage, and paging utilization percentage. The data and signaling KPIs may be calculated from raw data then forecasted in the future to predict cells and sectors that will break capacity limits.

Figure 4:
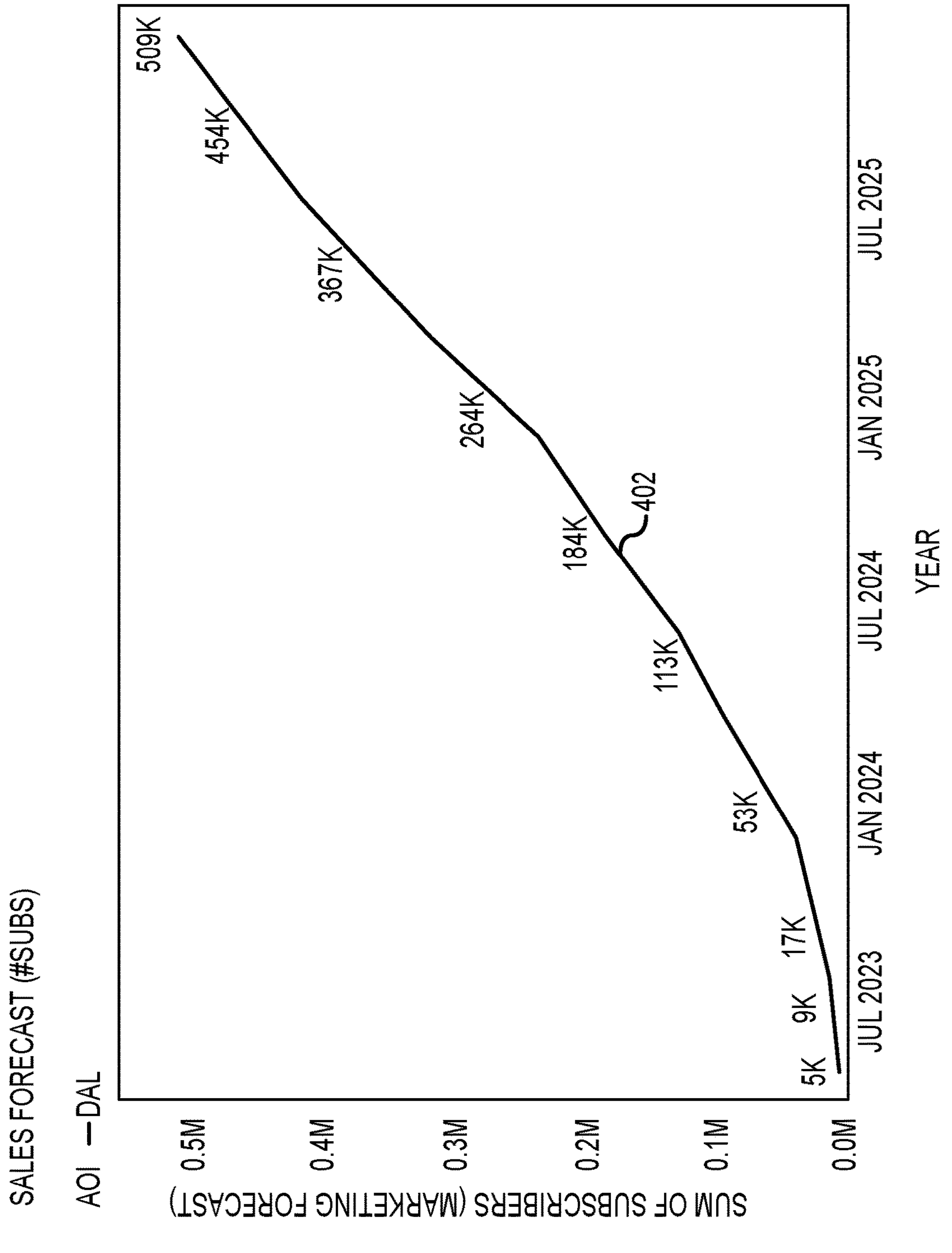
FIG. 4 illustrates an example forecast for network subscriber growth, in accordance with various embodiments.

In various embodiments, process 200 may include extrapolating the busy hour indicators based on growth forecasts to generate forecast indicators (Block 206). With brief reference to FIG. 4 and continuing reference to FIG. 2, a subscriber growth model 400 is shown, in accordance with various embodiments. The subscriber growth model 400 of FIG. 4 is an example projection of the likely subscriber growth in the Dallas, Texas, region of a new RAN network coming online in the region. In the example of FIG. 4, the subscriber growth is projected to be non-linear and to expand from around 5,000 subscribers in summer of 2023 to around 500,000 subscribers in winter of 2025. Subscriber growth model 400 can be used to extrapolate KPIs based on forecasted subscriber growth in a region of a RAN network.

The forecast performance indicators may be calculated using present performance data from cells and sectors, which was generated at cell sites by current subscriber numbers. Extrapolation may be performed by scaling from current subscriber numbers to projected subscriber levels using a subscriber growth model or subscriber growth function. Extrapolation can be performed by applying a scaling function to the calculated KPIs based on current data and the forecast of subscriber growth. The scaling function can be linear in some embodiments. The scaling function can also be more complex to mimic the likely changes in KPIs as subscriber numbers grow. For example, KPIs can be extrapolated using ML (machine learning) models including long short-term memory (LSTM) or modeling tools such as the Prophet tool made available by Meta Platforms, Inc. LSTM and Prophet are particular examples of time-series models that tend to take historical trends as an input and output the forecasted traffic and KPIs, though other time-series models or other types of models can be used.

Figure 5:
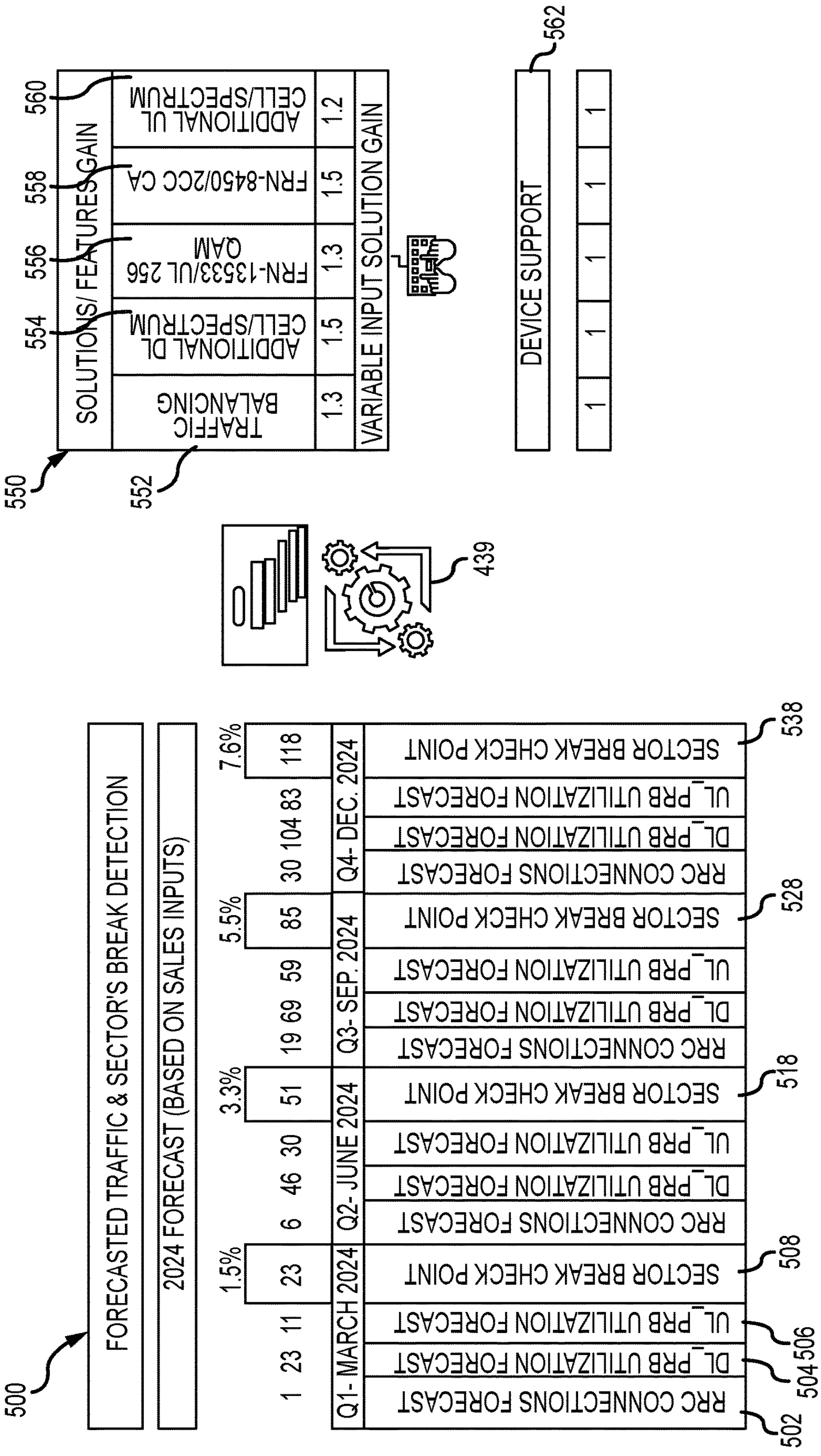
FIG. 5 illustrates an example extrapolation of future performance, in accordance with various embodiments.

Some embodiments of process 200 can apply a gain function to the extrapolated KPIs to generate revised forecast indicators (Block 208). The gain functions can be applied to mimic the impact of various features and network characteristics on capacity of network elements. With brief reference to FIG. 5, examples of identified sector breaks 500 that will breach capacity limits are shown before application of gain functions 539 to model the effect of solution/feature gain 550 on the network, in accordance with various embodiments. Sector breaks can be calculated based on connection forecasts 502 for the period, downlink utilization forecasts 504 for the period, and uplink utilization forecasts 506 for the period. The forecasts can be used to calculate sector breaks at the end of a first period 508, second period 518, third period 528, fourth period 538, or any number of periods. In the example of FIG. 5, the depicted periods are quarterly.

Gain function 539 may be applied to sector breaks 500 by applying capacity gains expected from future software features and new vendor features likely to reduce congestion problems in the future. The features can be planned future features that are projected to come online at different times. Features can increase capacity or reduce load enough to avoid breaking the sector in some embodiments.

For example, the capacity gain from traffic balancing 552 can be applied to sector breaks 500. Traffic balancing may result in a gain of 30%, for example, to the traffic distribution and tend to reduce traffic congestion by 30% gain. In another example, feature 554 may include adding cell/spectrum to the network. Adding a new cell to the sector can boost the capacity and add resources, which may tend to solve congestion by 50%, for example.

In another example, feature 556 may comprise a vendor software feature called UL 256 QAM, which tends to enhance resources utilization and allocation in the uplink. Feature 556 may increase uplink capacity by 30%. In yet another example, feature 558 may comprise FRN-8450/2CC CA, which is uplink carrier aggregation. Feature 558 may aggregate to cells/carriers (e.g., frequencies) together and provides a gain via resource sharing. Feature 558 may provide gain to UL capacity of 50%, for example. In still another example, feature 560 may comprise additional cell/spectrum in the uplink. Feature 560 may include adding a new cell or spectrum in the UL, which may result in gain of 20%, for example.

In various embodiments device support 562 may determine the percentage of the devices in the AOI that support features 552-560. In typical AOIs, not all the devices can support every network feature. This tends to reduce the experienced uplift per feature. Device support 562 may take only a percentage of the devices in the market that will benefit from a given feature. Device support 562 may be multiplied by the relevant feature gain to more accurately model likely network capacity.

Figure 6:
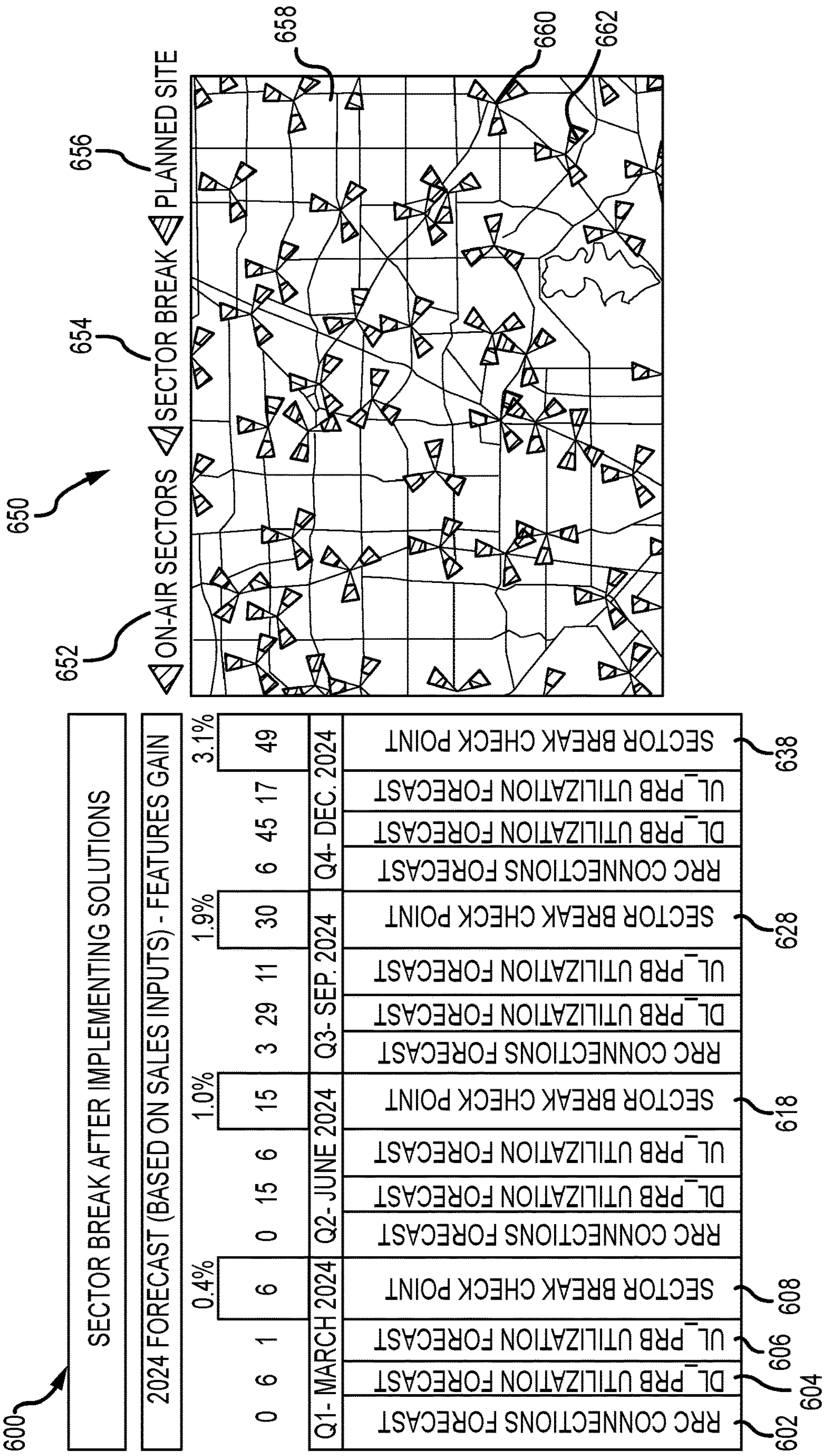
FIG. 6 illustrates an example interface for detecting sectors that will breach capacity limits, in accordance with various embodiments.

In various embodiments, process 200 includes detecting sectors that are forecast to breach capacity limits (Block 210). Referring briefly to FIG. 6, sector breaks 600 are shown after application of performance gain functions on their associated go-live timelines and prevalence in the network. Gain functions can be applied to reduce the number of sector breaks anticipated in response to post-gain connection forecasts 602, post-gain uplink utilization forecast 604, or post-gain downlink forecast 606. The post-gain application forecasts can be used to calculate sector breaks at the end of a first period 602, second period 618, third period 628, fourth period 638, or any number of periods while taking into account efficiencies gained in the network by features and other solutions.

In various embodiments, cell sites 660 and sectors 662 can be rendered or plotted on map 650 of a service region at the relative location of the site in the region. The projected capacity needs in each sector are used to determine which existing sectors are likely to breach capacity. The capacity of each sector is known, so when population increases in a sector and there is no overlapping sector with available capacity, a sector is likely to break. In order to service the area, a new cell site is typically planned with an overlapping sector. In some embodiments, existing sectors can be repositioned to overlap with a likely broken sector. In the example interface of FIG. 6, on-air sectors 652 are represented in a first visual indicator such as a color or pattern (e.g., green color), sector breaks 654 are represented in a second visual indicator (e.g., red color), and planned sectors 656 are represented by a third visual indicator (e.g., blue color). Using map 650 of area of interest (AOI) 658, new sectors can be automatically planned to alleviate a break in a neighboring sector. In some embodiments, the new sectors can be manually planned by an operator by placing the cell site and sectors in the map. The System can recalculate sector and cell breaks after new sites are planned to determine whether additional cell sites or sectors are still needed.

Process 600 tends to anticipate capacity breaks at the air interfaces (e.g., cell sites, sectors, towers, or other on-site hardware). The location and configuration of the cell sites can later be used to detect main haul bandwidth breaks, front haul bandwidth breaks, computing capacity breaks related to DUs, or computing capacity breaks related to CUs, for example. The need for cloud-computing infrastructure supporting wireless network 100 can thus be anticipated and scaled based at least in part on the locations and quantities of air interface hardware planned to alleviate capacity breaches.

Figure 7:
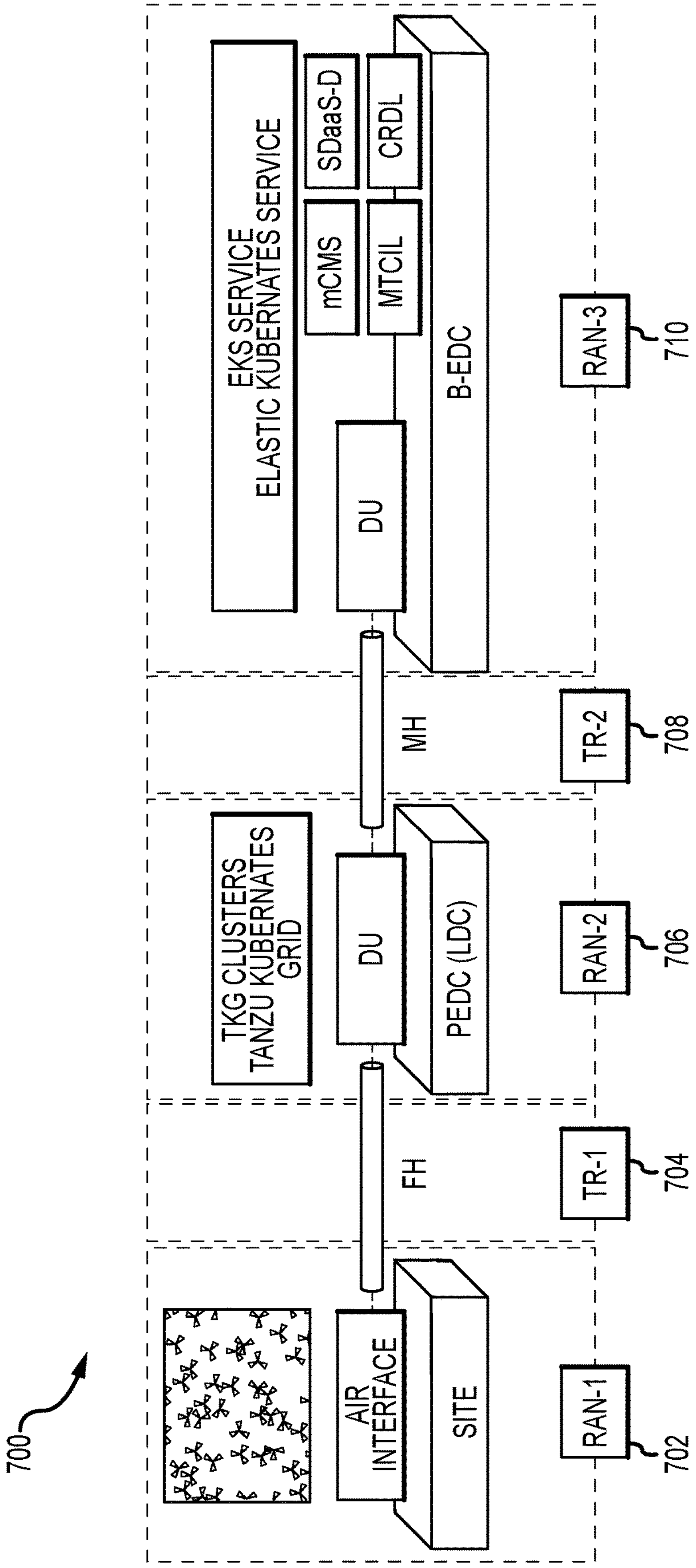
FIG. 7 illustrates an example technology stack for a cloud-based data and telephone network, in accordance with various embodiments.

Referring now to FIG. 7, network planning system 700 is shown, in accordance with various embodiments. The example network planning system 700 depicted in FIG. 7 can forecast capacity needs for all RAN components within an Open RAN network, incorporating virtualization and cloud-native attributes. The System thus anticipates and addresses capacity requirements across diverse network elements, ensuring optimized performance and resource allocation in a dynamic and adaptable network environment. Various embodiments of network planning system 700 may comprise variations of five modules each configured to assess impact at various segments of a cloud-based cellular network.

In various embodiments, network planning system 700 may include RAN-1 module 702 comprising cell sites on which air interface hardware is located. RAN-1 is the key module in the algorithm responsible for forecasting capacity across cells, sectors, and network sites. By applying certain thresholds, the RAN-1 module can predict the sectors that may exceed network limits. Accordingly, corrective actions are identified to alleviate capacity-related concerns and tend to prevent negative impact on customer experiences. The forecasting approach also allows ample time for future adjustments to rectify capacity shortcomings in the RAN-1 module. After implementing available solutions, including software features, optimization, and sector splits, the resolution typically involves the addition of new sites at the locations where the System predicts sector breaks.

In various embodiments, capacity breaches in the RAN-1 module can typically be cured by increasing air interface capacity through additional cell sites or additional sectors. The increased capacity on the air interface side (RAN-1) initiates a domino effect on the other components within the RAN architecture. Consequently, four subsequent modules may assess the impact on their respective components and forecast the supplementary resources suitable to accommodate the predicted surge in traffic.

Network planning system 700 may also include TR-1 module 704 including fronthaul infrastructure, in accordance with various embodiments. TR-1 evaluates the impact on fronthaul traffic transport between the Radio Unit (RU) and Distributed Unit (DU). Capacity breaches in the TR-1 module can typically be cured by increasing fronthaul transmission capacity through additional hardware such as new fiber infrastructure, wireless transmission infrastructure, or other communications infrastructure to increase communication bandwidth available to network 100.

In various embodiments, network planning system 700 includes RAN-2 module 706 comprising virtualized computing infrastructure running in a cloud-based environment. RAN-2 assesses and predicts the impact on DU resources and supporting cloud-based infrastructure. Computing hardware that supports the RAN-2 module may comprise an edge data center or local data center running virtualized DUs to support cellular network functions. DUs can run on any type of virtualization software, though in one example Kubernetes containers are used. In the container-based example, the RAN-2 module can project the impact of subscriber growth on the overlaying Kubernetes clusters used to manage DU instances. Capacity breaches in RAN-2 can typically be cured by increasing the amount of cloud computing time, processing power, or storge available to support DU activity.

Network planning system 700 may also include TR-2 module 708 including mid-haul infrastructure, in accordance with various embodiments. TR-2 module 708 can assess the effect of subscriber growth on mid-haul traffic transport from the DU towards the Central Unit (CU). Capacity breaches in the TR-2 module can typically be cured by increasing mid-haul transmission capacity through additional hardware such as new fiber infrastructure, wireless transmission infrastructure, or other communications infrastructure to increase communication bandwidth available to network 100.

In various embodiments, network planning system 700 includes RAN-3 module 710 comprising virtualized computing infrastructure running in a cloud-based environment. RAN-3 module 710 may anticipate the effect of increasing capacity needs from an increasing subscriber based on CU resources (control plane and user plane) and the RAN management functions provided by RAN vendors. In an example that uses Mavenir® software to support a cloud-based cellular network, management functions may include the Mavenir Central Management System (mCMS) for Performance and Fault Management, Mavenir Telecom Cloud Integration Layer (MTCIL) as the PaaS layer, Smart Deployment as a Service (SDaaS) for RU configuration management, and Cloud Range Data Layer (CRDL) for databases. All of these instances may operate within node groups in a cloud-native environment managed by Elastic Kubernetes Service (EKS) clusters on a public cloud such as, for example, the public cloud hosted by Amazon under the trademark AWS. The modules in network planning system 700 may output various capacity breaches that can be cured by adding corresponding infrastructure.

Figure 8A:
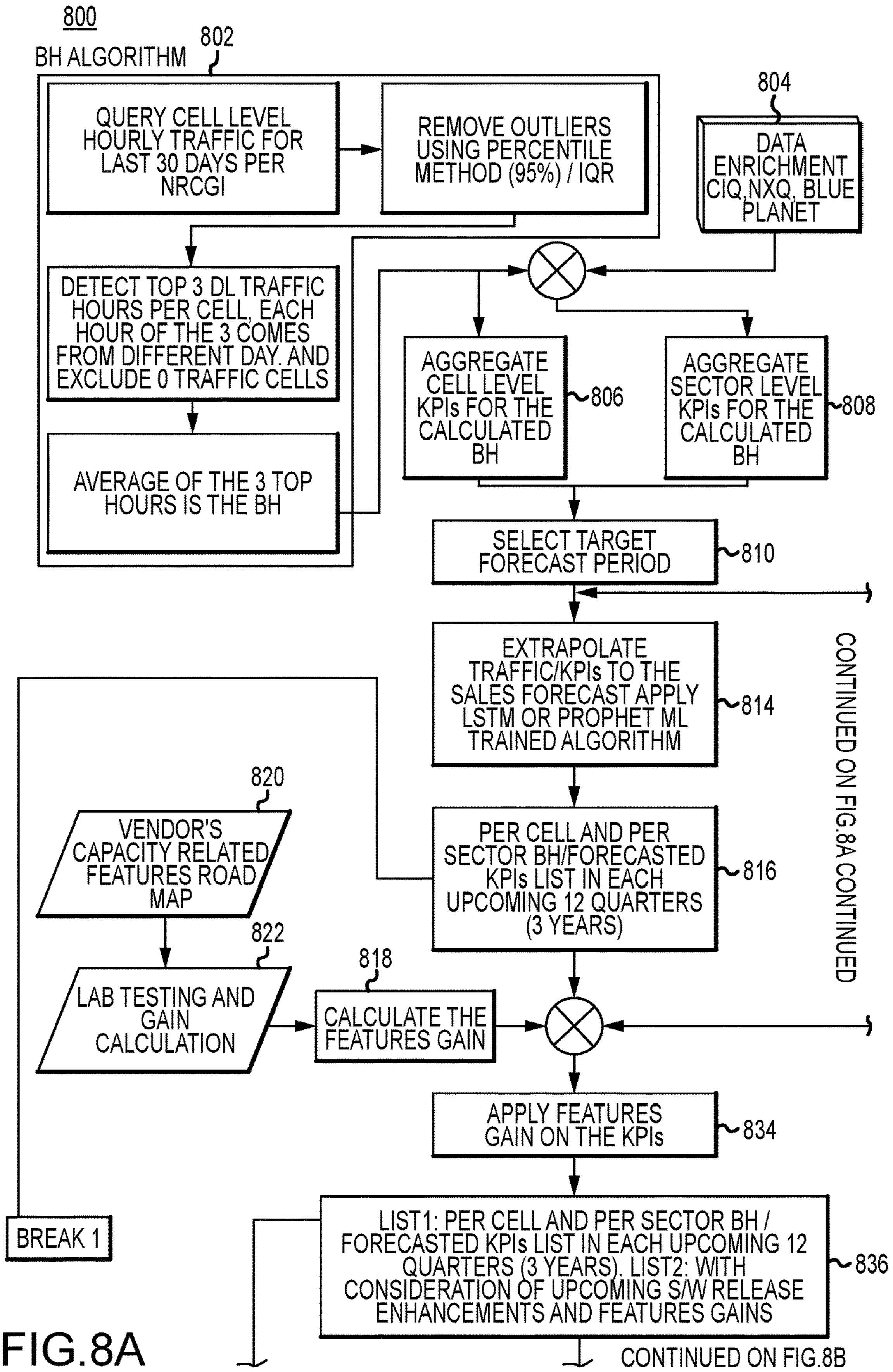
FIGS. 8A-8G illustrates an example process for detecting capacity breaches at cell sites and sectors of a cloud-based data and telephone network, in accordance with various embodiments.
Figure 8A:
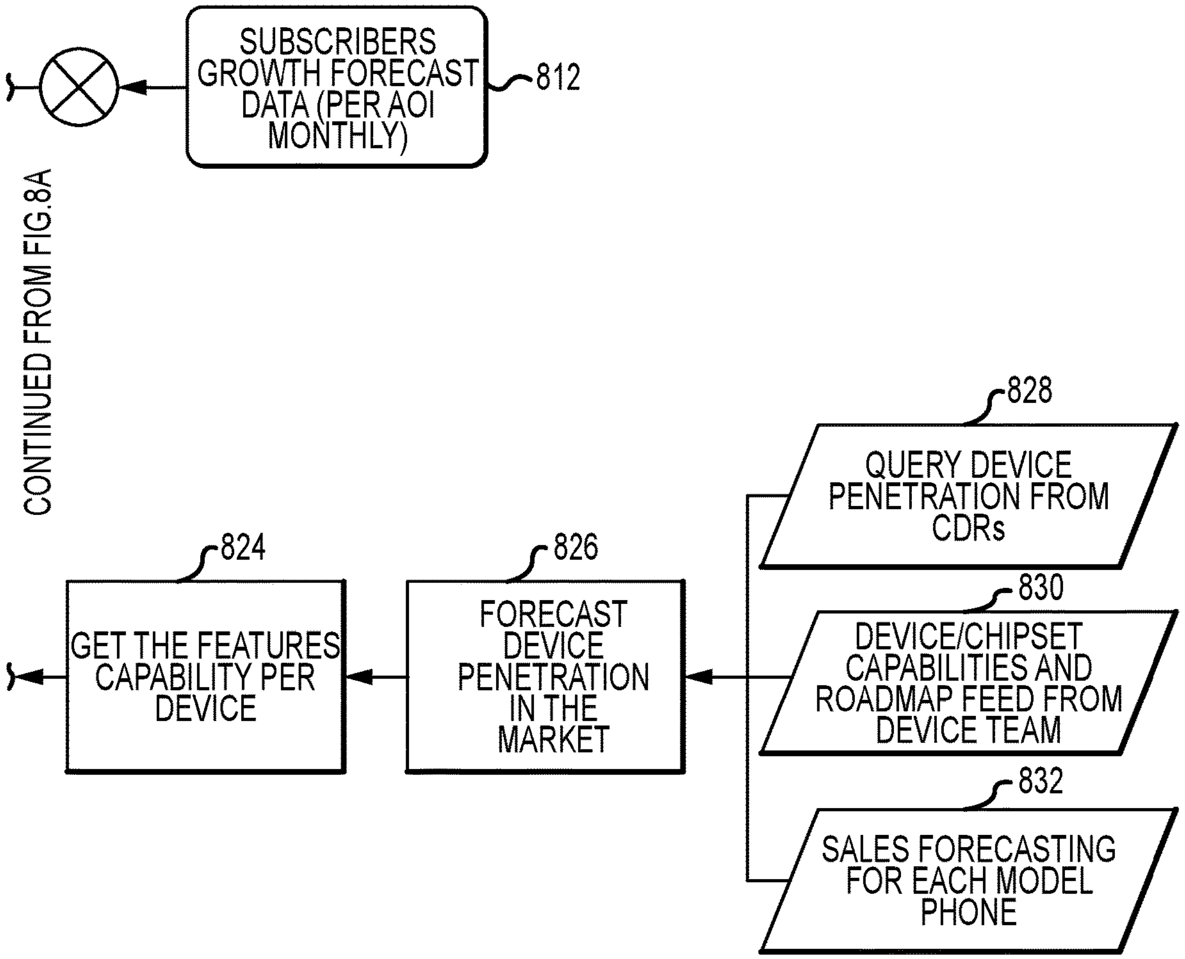

Referring now to FIGS. 8A-8G, a process 800 is shown for projecting capacity breaches, in accordance with various embodiments. Process 800 can run in the RAN-1 module 702 (of FIG. 7). Process 800 is depicted as broken up across FIGS. 8A-8G due to space constraints, though process 800 can be implemented as a single process, various embodiments contemplate process 800 implemented as a collection of subprocesses or as an individual subprocess. Breaks 1-11 and continuation annotation are labeled in FIGS. 8A-8G to illustrate where lines in the sub-figures break on one sheet and resume on another. In the example of FIG. 8A, the busy hour is identified (Block 802). The busy hour for a cell site, sector, or cell can be identified by querying data from network 100 for hourly traffic levels. The hourly traffic levels can be queried over a week, a month, 6 months, a year, or any other suitable period. In the example of FIG. 8A, the busy hour is identified using hourly data from the last 30 days.

In various embodiments, the outliers are removed from the results set for hourly data. The outliers may be removed by cutting off the highest or lowest percentiles, for example. In the example of FIG. 8A, the outliers are removed by applying a percentile method. The percentile method may be applied using approximately 95%. As used herein with reference to percentages, the term approximately may mean +/−1%, +/−2%, +/−3%, +/−4%, or +/−5%. With outliers omitted, the top three download traffic hours per cell are identified. Each of the three hours is selected from a different day. Cells, cell sites, or sectors with no traffic can be excluded in some embodiments. The average traffic level of the top three hours can be defined as the busy hour. The busy hour determination serves as an approximation for the highest traffic a cell site, sector, or cell is likely to experience during normal operation. The busy hour data may be augmented using data enrichment techniques and analysis (Block 804).

In various embodiments, process 800 may include aggregating cell-level KPIs for the calculated busy hour (Block 806). Process 800 may also aggregate sector level KPIs for the calculated busy hour (Block 808). Aggregation may be performed by summation or using an aggregation function. For example, KPIs for the four cells that make up a sector may be aggregated by addition to estimate KPIs for a sector. Continuing the example, three sectors that make up a cell can be aggregated by addition to estimate the KPIs for the cell. KPIs for sectors or cells may also be directly calculated from data collected on network 100.

Various embodiments of process 800 may select a target forecast period (Block 810). The target forecast period may be a number of days, weeks, months, quarters, or years. A forecast period may comprise a start date and an end date. Process 800 can also be performed for multiple forecast periods. For example, process 800 can be performed quarterly for the next year. The forecast periods might then be the periods ending in Q1, Q2, Q3, and Q4. In another example, process 800 can be performed annually for three years. The forecast periods might then be the years ending Dec. 31, 2024, Dec. 31, 2025, and Dec. 31, 2026. In the example depicted in FIG. 8, the forecast period is each of the upcoming quarters for three years.

In various embodiments, a subscriber growth model 400 of the area of interest is input into process 800 (Block 812). The area of interest may be the geographic region being modeled such as a city, state, county, country, or other region where network 100 is expected to experience subscriber growth. Subscriber growth may be modeled by growth function 402 in the area of interest. The KPIs are extrapolated based on the subscriber growth model (Block 814). KPIs may be extrapolated using a LSTM network or other AI techniques well-suited to the vanishing gradient problem present in traditional RNNs. Commercially available tools such as, for example, the Prophet forecasting tool made available by Meta Platforms, Inc. can be used to extrapolate KPIs. The AI systems and forecasting tools may be trained using network data and subscriber data from network 100 in other areas or from the area of interest in the past. After applying extrapolation tools, the forecasted KPIs, per-cell and per-sector, for the busy hour are output for the forecast period (Block 816). In the example of FIG. 8A, the forecast period is quarterly for the next three years.

Various embodiments of process 800 can consider efficiencies gained by hardware and software vendors whose products make up the infrastructure of network 100. Vendors that support network 100 may offer road maps of related features (Block 820). The features can be tested in a lab to determine the capacity gain related to each feature (Block 822). Process 800 can calculate the feature gain (Block 818) by applying features in times and locations according to the roadmap, and by associating the lab-tested gain with the features.

Process 800 may also consider efficiencies gained by device features of UE 141 in various embodiments. Call detail records (CDR) can be queried to determine device penetration (Block 828). Device and chipset capabilities are road mapped by a device team and output as a feed into process 800 (Block 830). Sales forecasting can be modeled for each make and model of device (Block 832). The modeling tools used for subscriber growth modeling can also be applied to device modeling, though other techniques may also be equivalently used. The device data is used to forecast device penetration in the area of interest (Block 826). With the device penetration estimated in the area of interest, the features capabilities per device can be calculated or otherwise determined (Block 824). For example, the features capability per device may be multiplied by the estimated number of devices at each forecasting period to determine the gain in capacity afforded by capable devices.

Figure 8B:
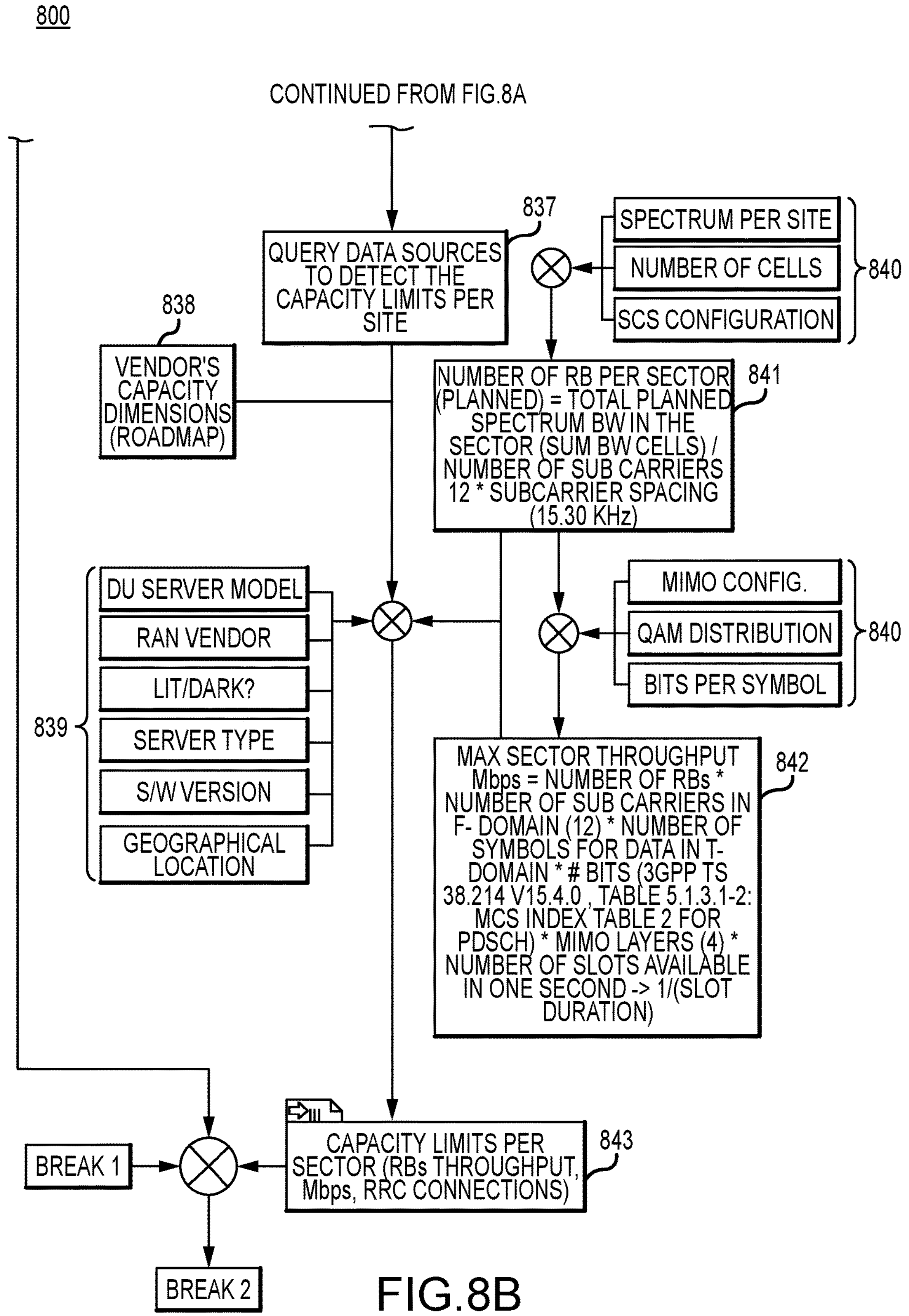

Referring now to FIG. 8B, a portion of process 800 is shown, in accordance with various embodiments. The features gain from network 100 and the features gain from UE 141 are applied to the busy-hour KPIs (Block 834). The gain may be applied to KPIs on a per-cell and per-sector basis. The resulting KPIs are adjusted for the performance gains associated with network 100 infrastructure and performance gains associated with the UE 141 (Block 836). The gain-adjusted KPIs may be maintained at a per-cell and per-site basis. Process 800 then queries data sources to detect the capacity limits per-site, per-sector, or per-cell (Block 837). Data inputs may include vendor capacity dimensions or roadmaps for hardware and software infrastructure (Block 838), a DU server model, RAN vendor, lit/dark data, server type, software versions, or geographic locations may be queried as input data 839.

In various embodiments, data inputs 840 may include spectrum per site, number of cells, and subcarrier spacing configuration. The number of planned radio base stations (RBs) per sector can be determined based on the total planned spectrum bandwidth in the sector divided by the number of cell carriers (e.g., 12) multiplied by the subcarrier spacing (Block 841). The planned spectrum bandwidth in the sector may be, for example, the sum of bandwidth cells. The subcarrier spacing can be a width of a frequency band such as, for example, 15.3 KHz.

In various embodiments, data inputs 840 may include multiple-input multiple-output (MIMO) configuration, quadrature amplitude modulation (QAM) distribution, and bits per symbol data. Maximum sector throughput in Megabits per second (Mbps) can be equal to the number of RBs, multiplied by the number of carriers in the f-domain (e.g., 12), multiplied by the number of symbols for data in the t-domain, multiplied by the number of bits, multiplied by the number of MIMO layers (e.g., 4), multiplied by the number of slots available in one second (e.g., 1/(slot duration)) (Block 842). The foregoing inputs and calculations may output capacity limits per sector (Block 843). Capacity limits per sector may include the number of RBs, throughput (e.g., Mbps up and down), and radio resource control (RRC) connections, for example.

Figure 8C:
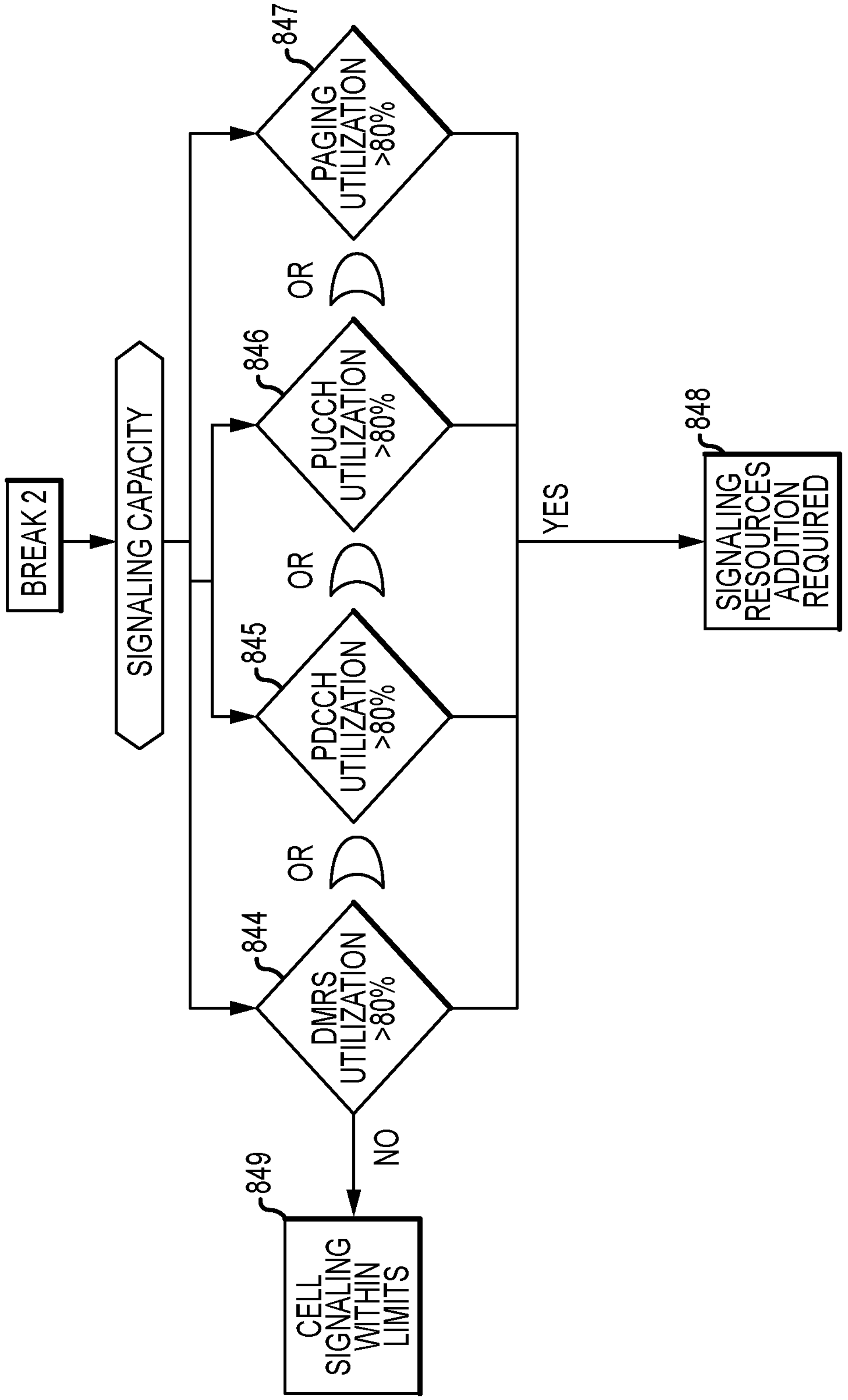

Referring now to FIG. 8C, a portion of process 800 is shown, in accordance with various embodiments. Capacity limits from block 843, forecast KPIs from block 816, and gain-adjusted KPIs from block 836 may be used as input to assess signaling capacity. Signaling capacity may be checked by comparing metrics to threshold values. Metrics can include DMRS utilization 844, PDCCH utilization 845, PUCCH utilization 846, or paging utilization 847, for example. In the example of FIG. 8C, each metric is compared to a threshold of approximately 80% of capacity. Other examples could use as a threshold approximately 95% of capacity, approximately 90% of capacity, or approximately 85% of capacity, or approximately 75% of capacity.

The metrics used can be combined using or—gate logic. That is, if one or more of the metrics exceed their threshold values then the output indicates a need for additional signaling resources at the end of the forecast period (Block 848). These metrics (i.e., extrapolated KPIs) exceeding the thresholds indicate a signaling capacity breach. If none of the metrics exceed their capacity thresholds, then the output indicates that cell signaling is within capacity at the end of the forecast period (Block 849).

Figure 8D:
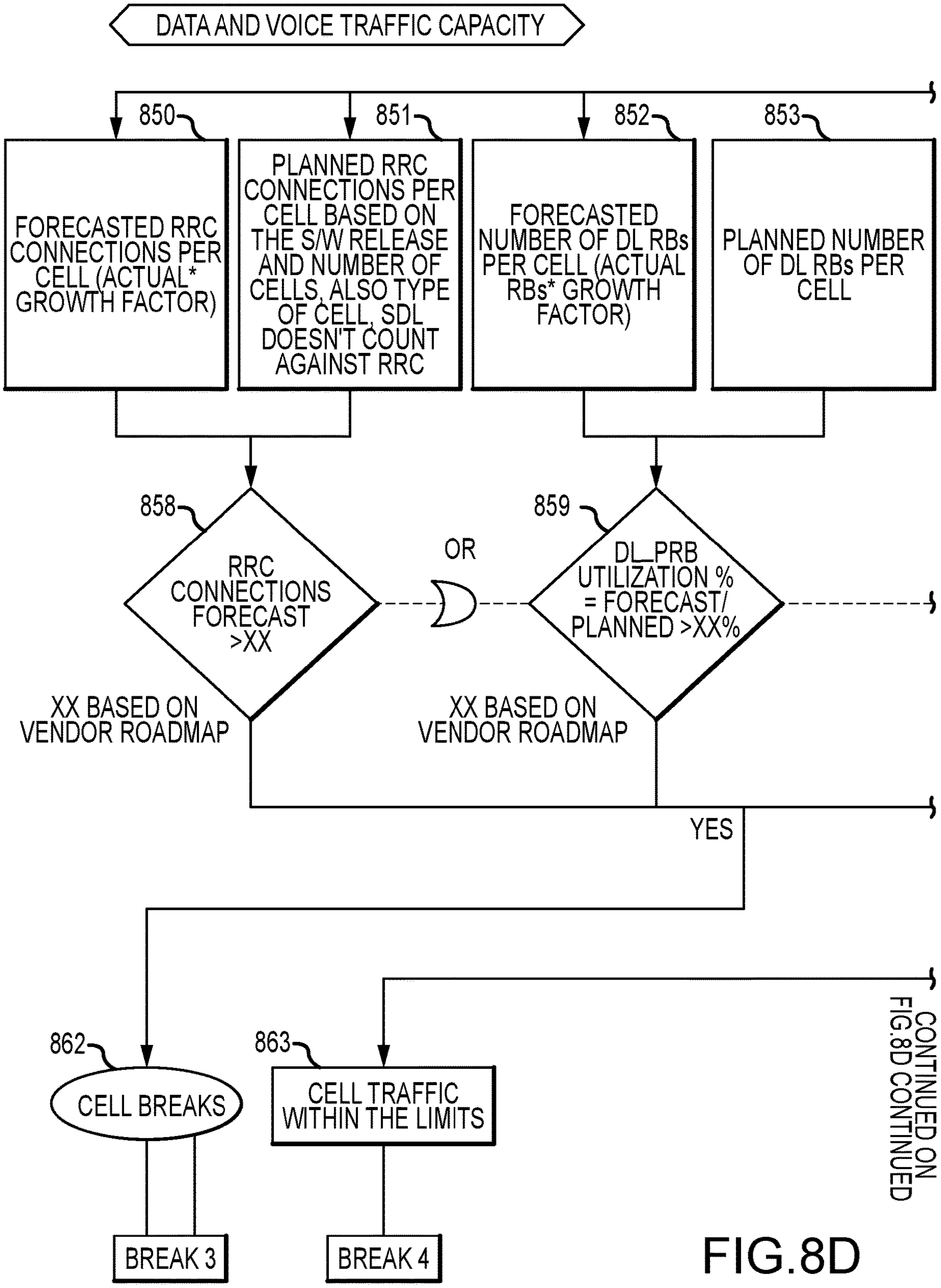
Figure 8D:
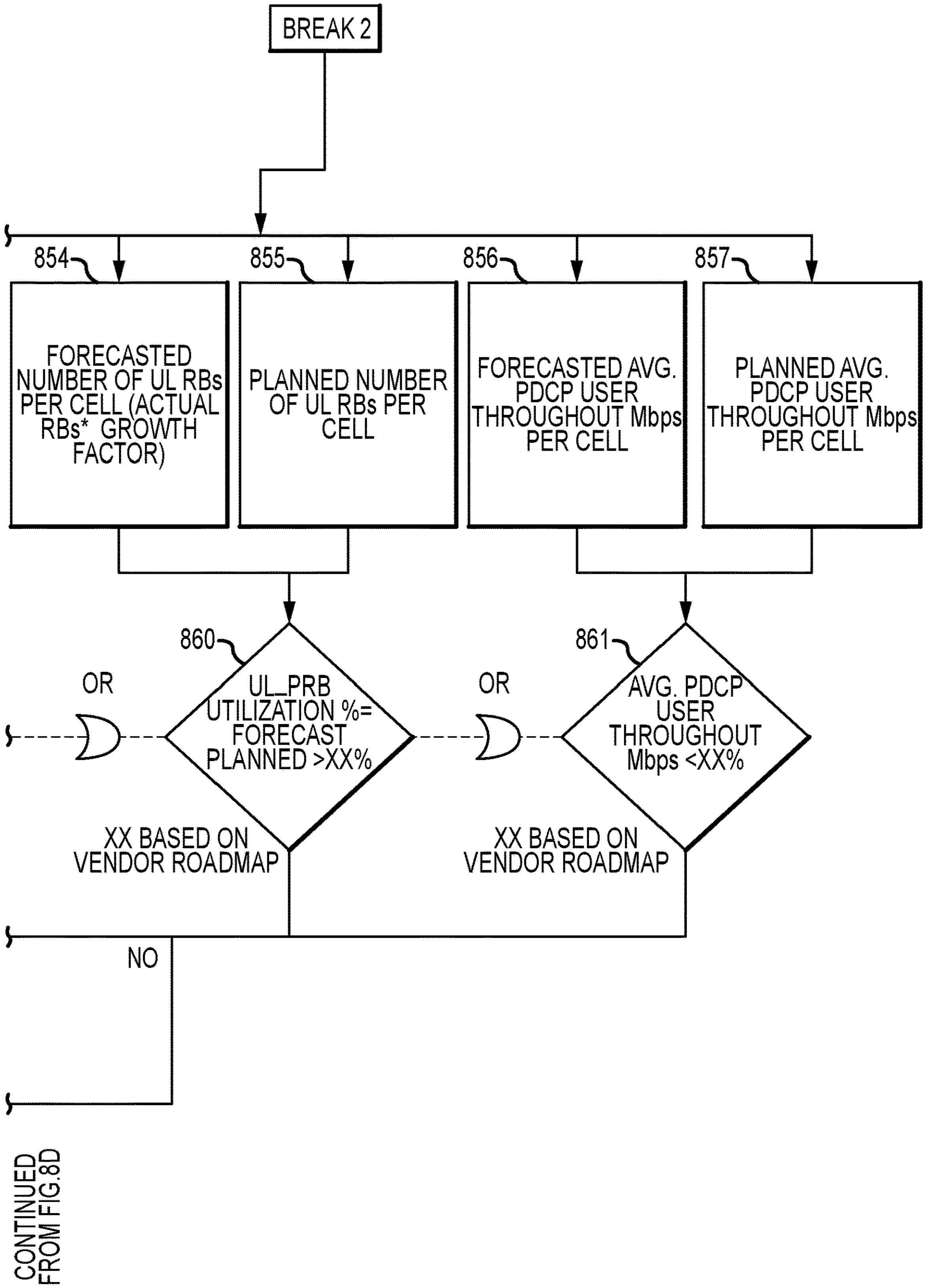

Referring now to FIG. 8D, a portion of process 800 is shown, in accordance with various embodiments. Capacity limits from block 843, forecast KPIs from block 816, and gain-adjusted KPIs from block 836 may be used as input to assess data and voice traffic capacity at the cell level. Data and voice traffic capacity may be checked by comparing various metrics to threshold values. Input KPIs can include the forecast RRC connections per cell 850 (e.g., actual connections per cell multiplied by a growth factor for the forecast period). Input KPIs can also include planned RRC connections per cell based on the software release and number of cells 851. The type of cell and supplementary downlink (SDL) connections may be excluded from RCC count in some embodiments. The resulting metric of RRC connections forecast can be compared to a threshold value for capacity (Block 858). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, input KPIs can include a forecast number of downlink RBs per cell 852 (e.g., current RBs multiplied by a growth factor for the forecast period). Input KPI may also include the planned number of downlink RBs per cell 853. These factors can be used to compare the metric downlink RB utilization with a capacity threshold (Block 859). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, input KPIs can include a forecast number of uplink RBs per cell 854 (e.g., current RBs multiplied by a growth factor for the forecast period). Input KPI may also include the planned number of uplink RBs per cell 855. These factors can be used to compare the metric uplink RB utilization with a capacity threshold (Block 860). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, the input KPIs can include forecast average PDCP user throughput per cell 856 (e.g., Mbps per cell). The input KPIs can also include planned average PDCP user throughput 857. The KPIs can be used to compare the metric average PDCP user throughput to a threshold value (Block 861). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, the comparison between metrics to the thresholds of blocks 872, 873, 874, and 875 can be combined using or—gate logic. That is, if one or more of the metrics exceed their threshold values then the output indicates a need for additional data and voice capacity at the end of the forecast period (Block 848). These metrics (i.e., extrapolated KPIs) exceeding the thresholds indicate a capacity breach that will result in a cell break 862. If none of the metrics exceed their capacity thresholds, then the output indicates that data and voice traffic capacity is sufficient at the end of the forecast period (Block 863).

Figure 8E:
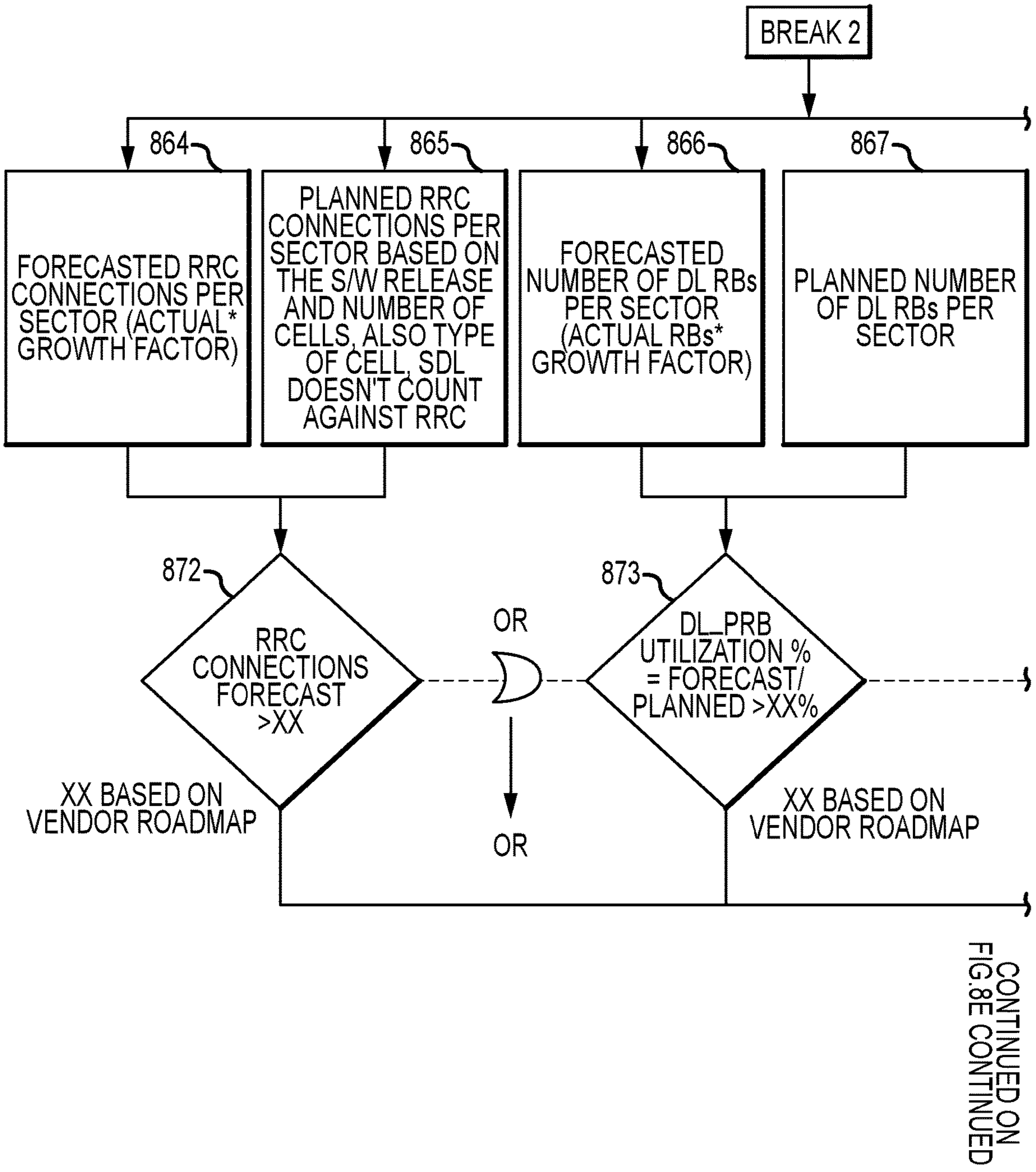
Figure 8E:
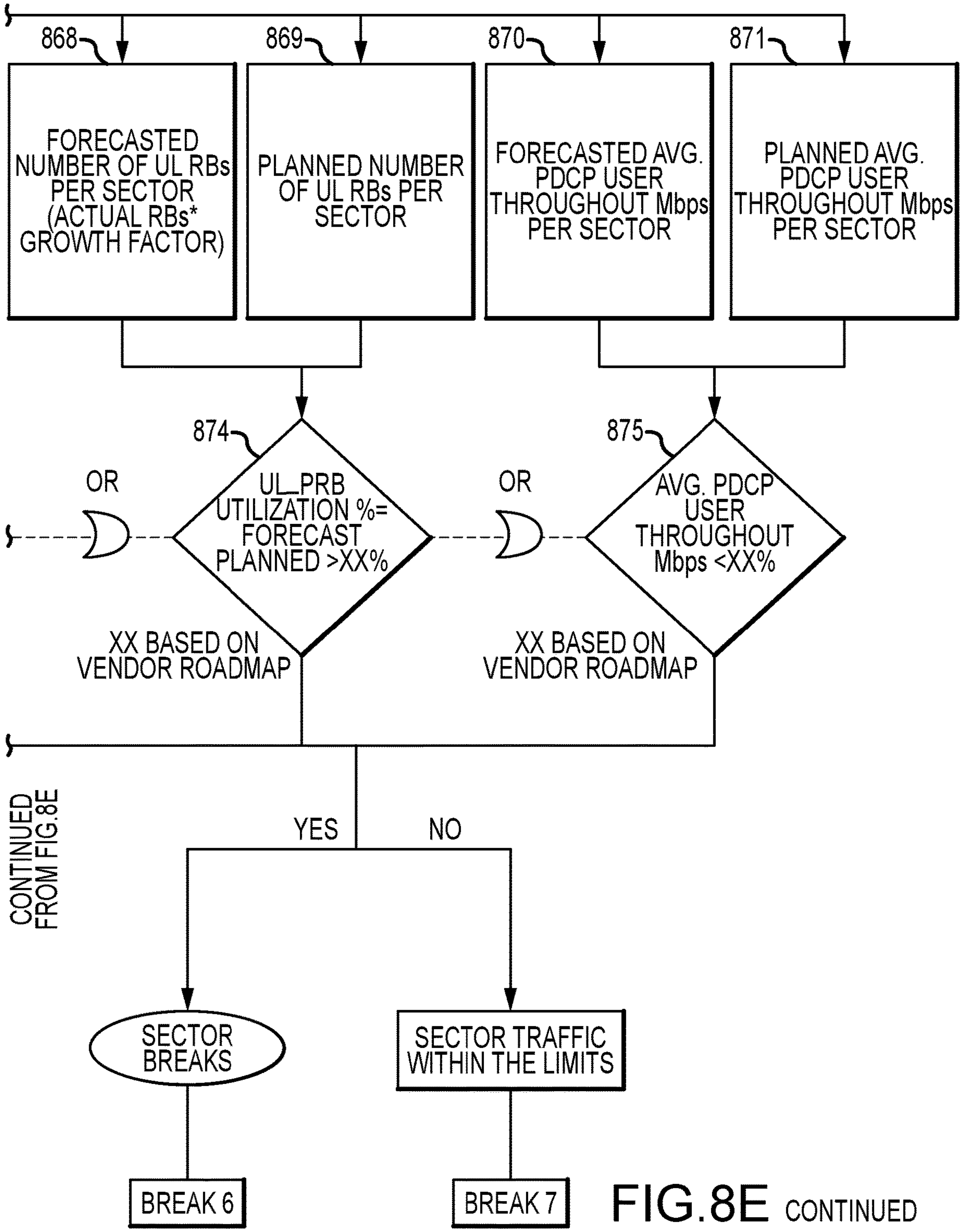

Referring now to FIG. 8E, a portion of process 800 is shown, in accordance with various embodiments. Capacity limits from block 843, forecast KPIs from block 816, and gain-adjusted KPIs from block 836 may be used as input to assess data and voice traffic capacity at the sector level. Data and voice traffic capacity may be checked at a sector level by comparing various metrics to threshold values. Input KPIs can include the forecast RRC connections per sector 864 (e.g., actual connections per sector multiplied by a growth factor for the forecast period). Input KPIs can also include planned RRC connections per sector based on the software release and number of sectors 865. The type of cells and SDL connections may be excluded from RCC count in some embodiments. The resulting metric of RRC connections forecast can be compared to a threshold value for capacity (Block 872). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, input KPIs can include a forecast number of downlink RBs per sector 866 (e.g., current RBs multiplied by a growth factor for the forecast period). Input KPI may also include the planned number of downlink RBs per sector 867. These factors can be used to compare the metric downlink RB utilization with a capacity threshold (Block 873). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, input KPIs can include a forecast number of uplink RBs per sector 868 (e.g., current RBs multiplied by a growth factor for the forecast period). Input KPI may also include the planned number of uplink RBs per sector 869. These factors can be used to compare the metric uplink RB utilization with a capacity threshold (Block 874). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, the input KPIs can include forecast average PDCP user throughput per sector 870 (e.g., Mbps per sector). The input KPIs can also include planned average PDCP user throughput 871. The KPIs can be used to compare the metric average PDCP user throughput to a threshold value (Block 875). The threshold value can be determined based on a relevant hardware or software vendor's roadmap or other documentation, for example. The threshold value may also be selected as a constant such as, for example, approximately 95%, approximately 90%, approximately 85%, or approximately 80%.

In various embodiments, the comparison between metrics to the thresholds of blocks 858, 859, 860, and 861 can be combined using or—gate logic. That is, if one or more of the metrics exceed their threshold values then the output indicates a need for additional data and voice capacity at the end of the forecast period (Block 862). These metrics (i.e., extrapolated KPIs) exceeding the thresholds indicate a capacity breach that will result in a sector break. If none of the metrics exceed their capacity thresholds, then the output indicates that data and voice traffic capacity is sufficient at a sector level at the end of the forecast period (Block 863).

Figure 8F:
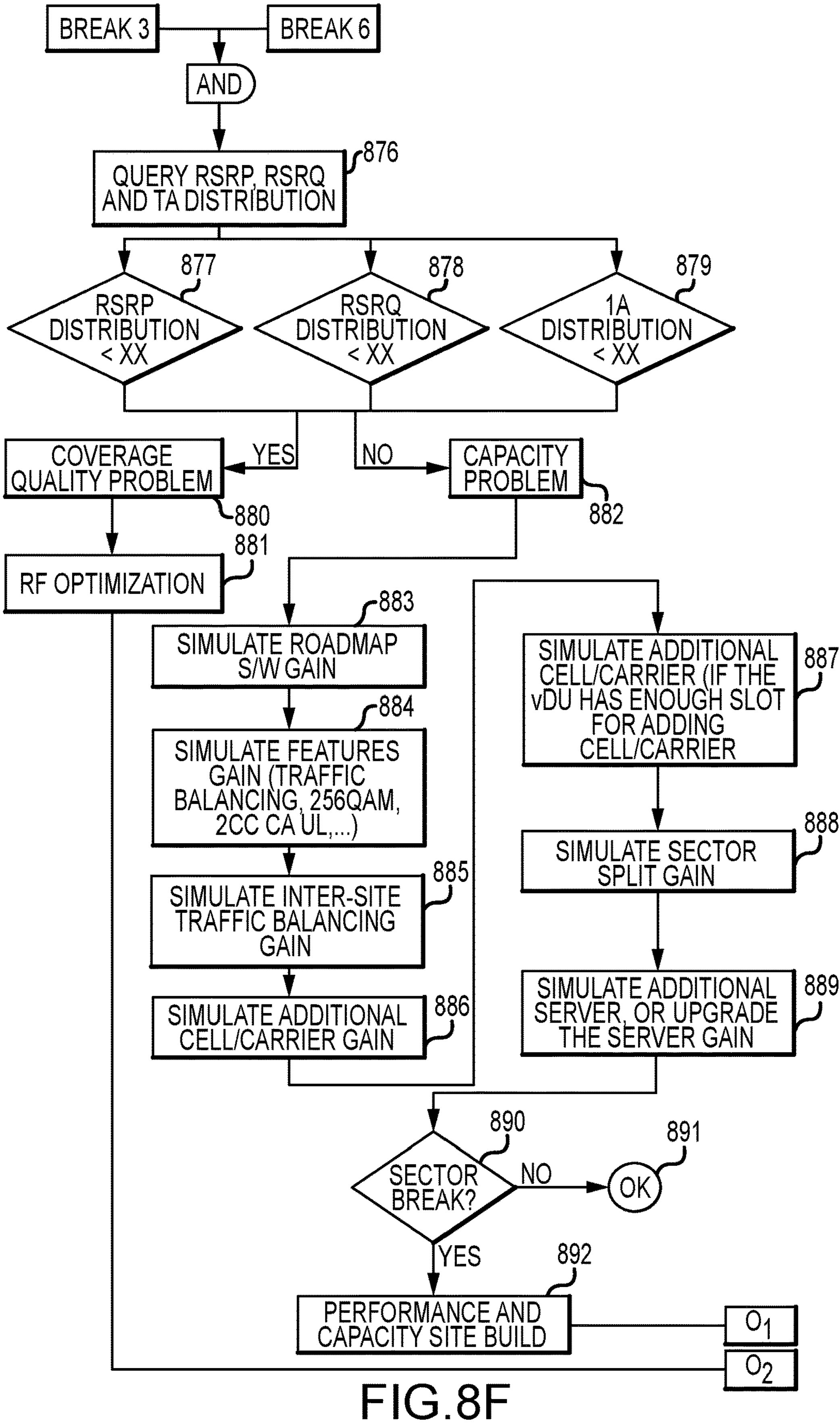

Referring now to FIG. 8F, a portion of process 800 is shown, in accordance with various embodiments. In the example of FIG. 8F, cell break 862 data from FIG. 8D and sector break data from FIG. 8E are taken as inputs. Process 800 queries reference signal received power (RSRP), reference signal received quality (RSRQ), and timing advance (TA) distribution data for the cell sites, associated sectors, or associated cells that were detected to have cell breaks or sector breaks. The RSRP distribution 877, RSRQ distribution 878, and TA distribution 879 may each be checked against threshold values. The threshold value can be determined based on a relevant hardware or software vendor's roadmap or other documentation, for example. The threshold value may also be selected as a constant such as, for example, approximately 95%, approximately 90%, approximately 85%, or approximately 80%. Other functions of network data could also be equivalently used to determine threshold values described herein.

The comparison results can be combined using or—gate logic. That is, if one or more of the metrics exceed their threshold values then the output indicates a coverage quality problem (Block 880). These metrics (i.e., extrapolated KPIs) exceeding the thresholds indicate a quality breach. Radio frequency optimization may be performed on the identified sectors and cells (Block 881, and the output O2 is later taken as input into the RAN-1 Module Result. If none of the metrics exceed their capacity thresholds, then the output indicates a capacity problem (882).

In various embodiments, a capacity problem may be assessed by simulating the roadmap software gain (Block 883), simulating features gain (Block 884), simulating inter-site traffic balancing gain (Block 885), simulating additional cell/carrier gain (Block 886), simulating additional cell/carrier if the vDU has available slots (Block 887), simulating sector split gain (Block 888), or simulating additional server or server upgrade gain (Block 889). Capacity is assessed after applying the gain functions (Block 890). If the capacity with expected gains is greater than the forecast utilization, then the sector is OK (Block 891). If the capacity with expected gains is less than the forecast utilization, then the output indicates a site build for increased performance and capacity (Block 892). The resulting site build determinations are output, and the output O1 is later taken as input into the RAN-1 Module Result. Build determinations may include a proposed site location, approximate build location, or a recommended build region for the site. Build determinations may also include the capacity and performance specifications for the new site that will resolve projected breaches.

Figure 8G:
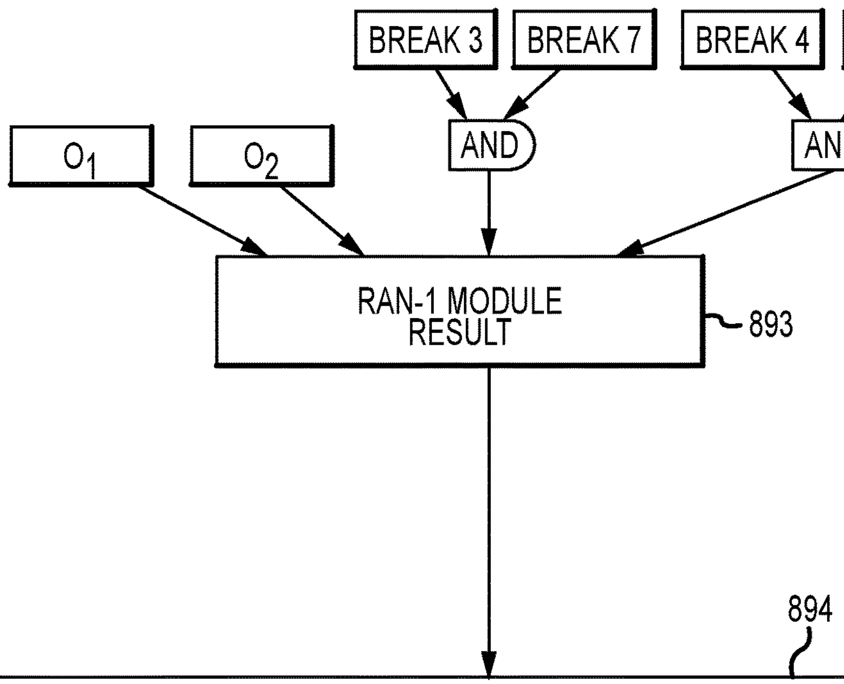

Referring now to FIG. 8G, a portion of process 800 is shown, in accordance with various embodiments. In the example of FIG. 8G, outputs O1 and O2 are taken as inputs along with data for cells with breaks 862 and data for associated sectors with traffic within limits, along with data for cells with traffic within limits 863 and data for associated sectors with traffic within limits. RAN-1 module result 893 aggregates analysis from the previous steps in process 800. Outputs 894 from the RAN-1 module may include the number of sectors that break in each forecast period, the list of sectors that break, the capacity breach types in each sector, and a list of performance and capacity sites for building.

Figure 9:
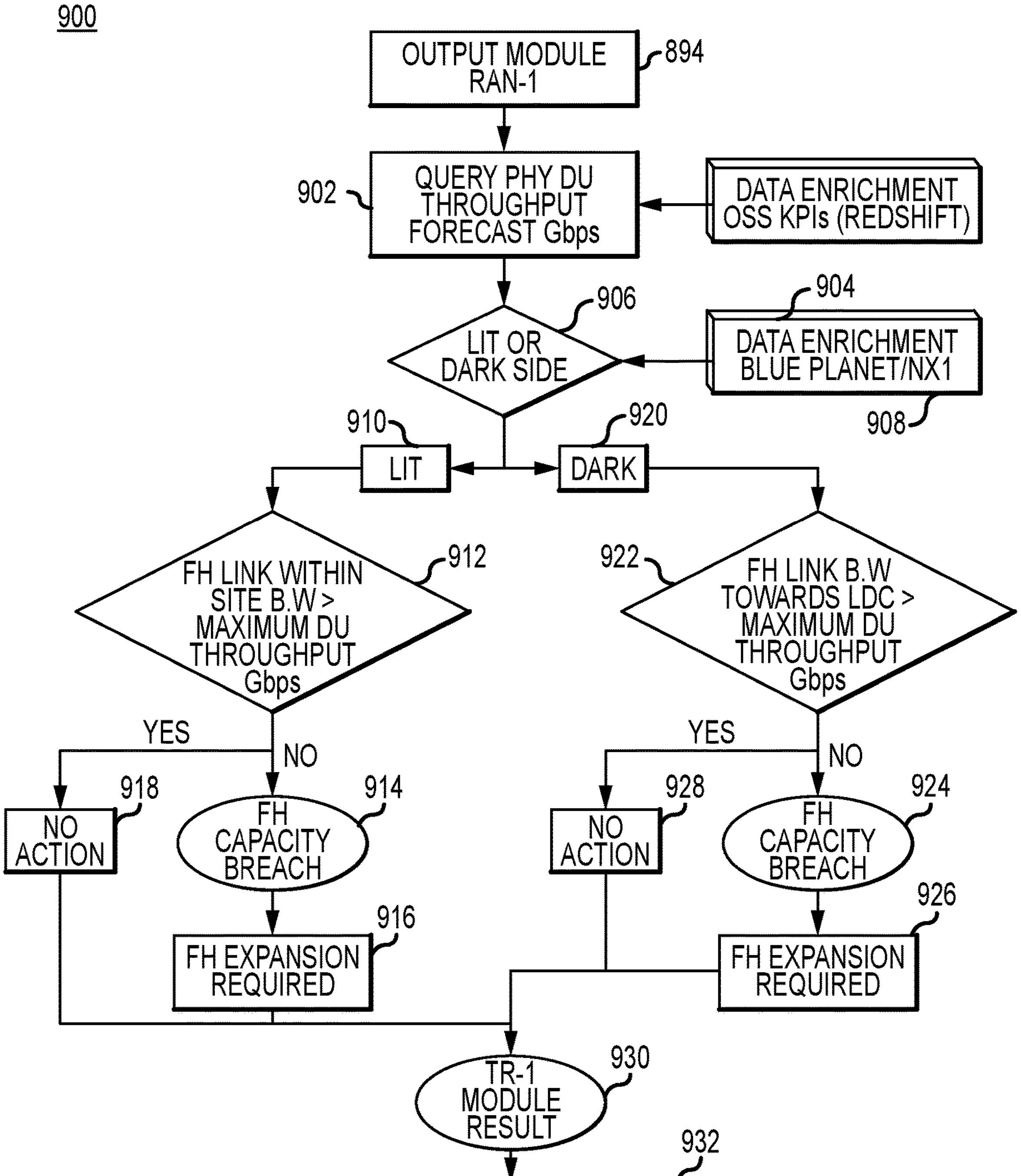
FIG. 9 illustrates an example process for detecting capacity breaches in front haul infrastructure of a cloud-based data and telephone network, in accordance with various embodiments.

With reference to FIG. 9, process 900 is shown for projecting fronthaul capacity breaches, in accordance with various embodiments. Process 900 can run in TR-1 module 704 of FIG. 7. The output 894 from the RAN-1 module may be taken as an input to process 900. Process 800 may include querying the physical DU throughput forecast (Block 902). The throughput forecast may be represented in Gbps or other data transfer measurements. The throughput forecast may be enriched with OSS KPIs (Block 904). In an example cloud-based data and telephone network 100 running on AWS, Amazon's Redshift data tools may be used for KPI enrichment.

In various embodiments, process 900 may check whether the cell site is lit or dark (Block 906). In determining whether the cell site is lit or dark, sites may be polled, network data may be queried, or other data sources may be used. In an example using databases that contain site configuration information such as, for example, tools available under the tradenames BLUE PLANET or NX1. Information contained in the databases may include, for example, whether a site is lit or dark. Lit and dark are architectures of cell site deployment. In a lit site, the DU is located at the site location. In a dark site, the DU is located at a centralized data center, which can allow a DU to be shared between multiple cell sites. Building a lit or dark site can depend on availability of a fiber connection between the site and data center. If a suitable connection is available, a dark site may be constructed. If not available then the DU may be located onsite due to latency considerations.

In various embodiments and in response to a site being lit (Block 910), process 900 checks whether the physical link at the cell site has bandwidth greater than the maximum DU throughput (Block 912). If not, a fronthaul capacity breach is indicated (Block 914). Fronthaul capacity expansion is identified to meet the increased fronthaul capacity needs (Block 916). If the existing link has greater capacity than the maximum DU throughput, then no breach is indicated (Block 918).

In various embodiments and in response to a cell site being dark (Block 920), process 900 checks whether the fronthaul link bandwidth to the local data center is greater than the maximum DU throughput (Block 922). If the fronthaul link has greater bandwidth than the maximum DU throughput, then fronthaul capacity is sufficient (Block 928). In response to the fronthaul link having less bandwidth than the maximum DU throughput, a fronthaul capacity breach is identified (Block 924). Fronthaul capacity expansion is identified to meet the increased fronthaul capacity needs and cure the breach (Block 926).

In various embodiments, the fronthaul capacity results are used as inputs to the TR-1 module result 930. Output 932 from TR-1 may include the number of new fronthaul links recommended, the number of fronthaul expansion links recommended, the location of new or expansion links, the forecast period in which the expanded capacity will be recommended, or other data relevant to fronthaul capacity expansion.

Figure 10:
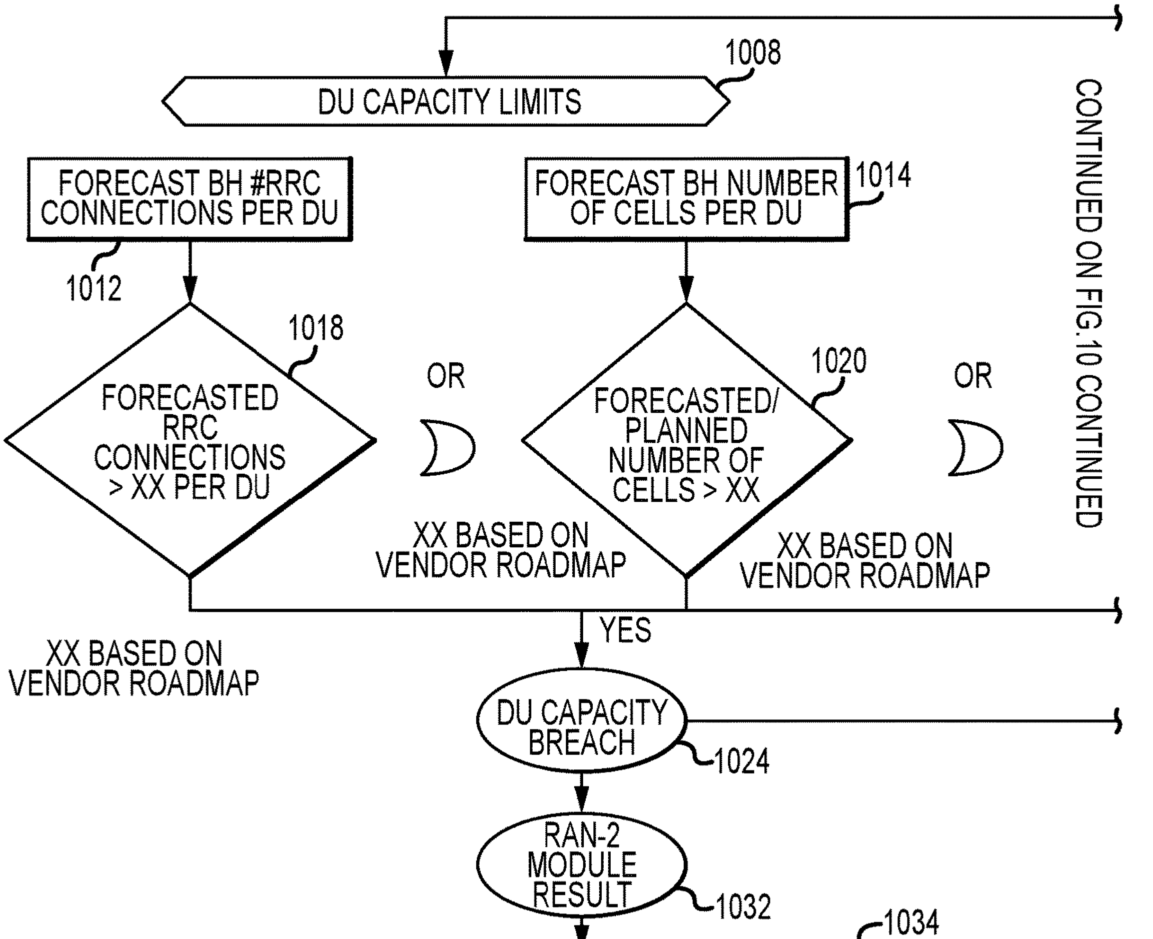
FIG. 10 illustrates an example process for detecting capacity breaches in cloud-based distributed units of a cloud-based data and telephone network, in accordance with various embodiments.
Figure 10:
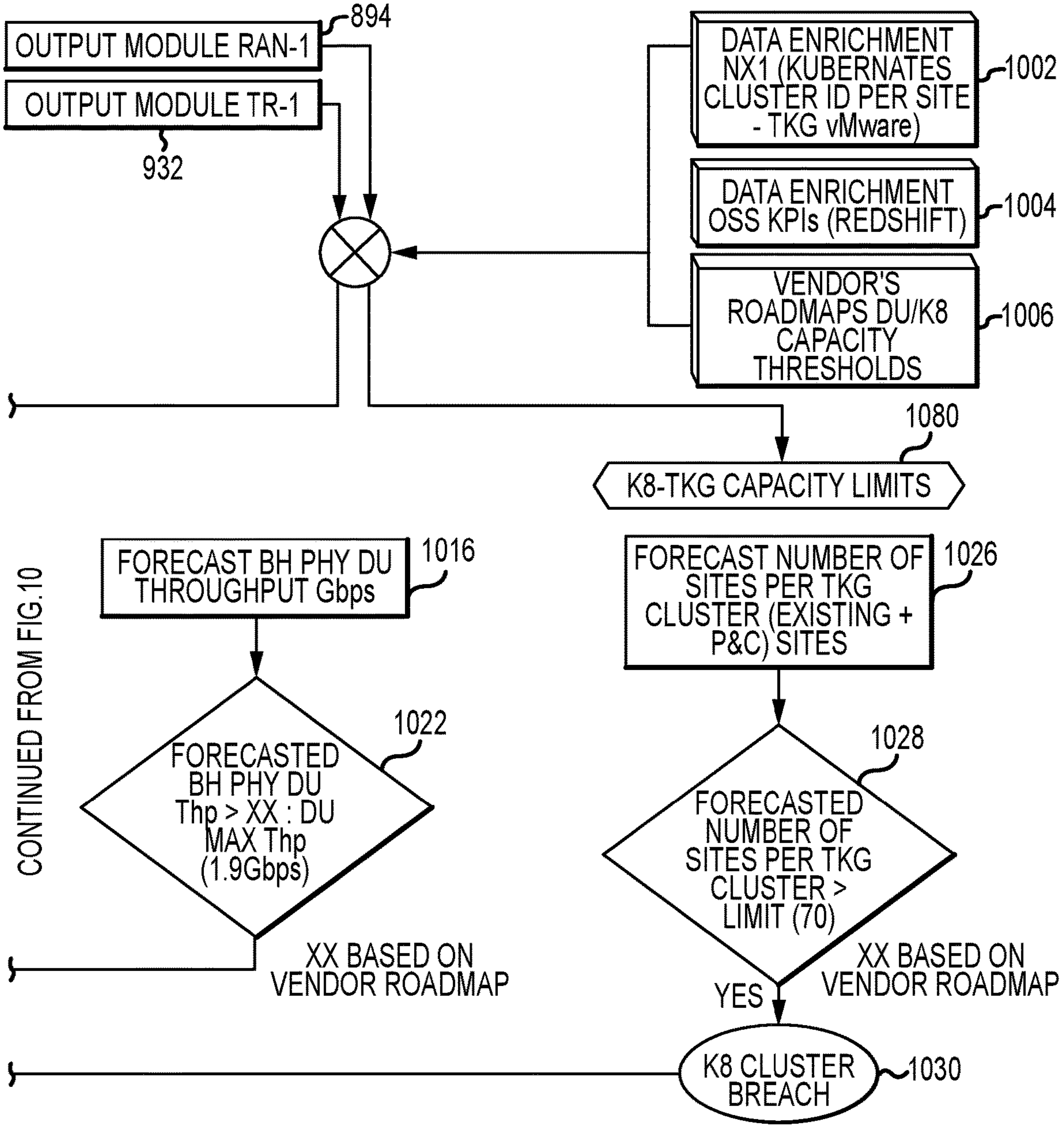

With reference to FIG. 10, process 1000 is shown for projecting DU capacity breaches, in accordance with various embodiments. Process 1000 can run in RAN-2 module 706 of FIG. 7. The output 894 from the RAN-1 module and output 932 from the TR-1 module may be taken as an input to process 1000. The inputs can be augmented with data enrichment 1002 using NX1 data. In an example using container-based DUs, one Kubernetes cluster ID may be used per site and may be used to retrieve associated data in TKG VMware. Data enrichment 1004 may also be performed using OSS KPIs (e.g., using Redshift tools available on AWS). Data enrichment 1006 may be performed using vendor roadmaps, DU capacity thresholds, or Kubernetes capacity thresholds.

Various embodiments check DU capacity limits by comparing various metrics to threshold values (Block 1008). The metrics (e.g., forecast KPIs) used to assess DU capacity for breaches may include the forecast number of RRC connections during busy hour per DU 1012, the forecast busy hour number of cells per DU 1014, and the forecast busy hour physical DU throughput 1016 (e.g., Gbps). Process 1000 may check whether the forecast number of RRC connections during busy hour per DU 1012 are greater than a threshold value (Block 1018), whether the forecast busy hour number of cells per DU 1014 is greater than a threshold value (Block 1020), or whether the forecast busy hour physical DU throughput 1016 is greater than a threshold value (Block 1022).

In various embodiments, the comparison between metrics to the thresholds of blocks 1018, 1020, and 1022 can be combined using or—gate logic. That is, if one or more of the metrics exceed their threshold values then the output indicates a need for additional DU capacity at the end of the forecast period (Block 1024). These metrics (i.e., extrapolated KPIs) exceeding the thresholds indicate a capacity breach that will result in a DU capacity breach. If none of the metrics exceed their capacity thresholds, then the output may indicate that DU capacity is sufficient at the end of the forecast period.

Various embodiments of process 1000 may check container capacity limits by comparing various metrics to threshold values. The metrics (e.g., forecast KPIs) used to assess container capacity for breaches may include the forecast number sites per TKG cluster 1026 (e.g., existing sites plus planned sites for performance and capacity). Process 1000 may check whether the forecast number sites per TKG cluster 1026 is greater than a threshold value (Block 1028). The threshold value may be a limit such as, for example, approximately 60, approximately 70, approximately 80, or approximately 90 sites per cluster. As used herein to describe counts, the term approximately may mean +/−5, +/−10, +/−15, +/−20, or +/−25.

In various embodiments, the comparison between metrics to the thresholds of block 1028 can indicate a Kubernetes cluster breach 1030 in response to the forecast number of sites per cluster exceeding the threshold value (Block 1028). These metrics (i.e., extrapolated KPIs) exceeding the thresholds indicate a capacity breach that will result in a container cluster capacity breach. If the number of sites per cluster does not exceed the capacity threshold, then the output may indicate that container capacity is sufficient at the end of the forecast period. Data regarding DU capacity breach 1024 and Kubernetes cluster capacity breach 1030 is used in RAN-2 module result 1032. Output 1034 of the RAN-2 module may include a number of additional DU servers recommended and a number of additional container clusters recommended.

Figure 11:
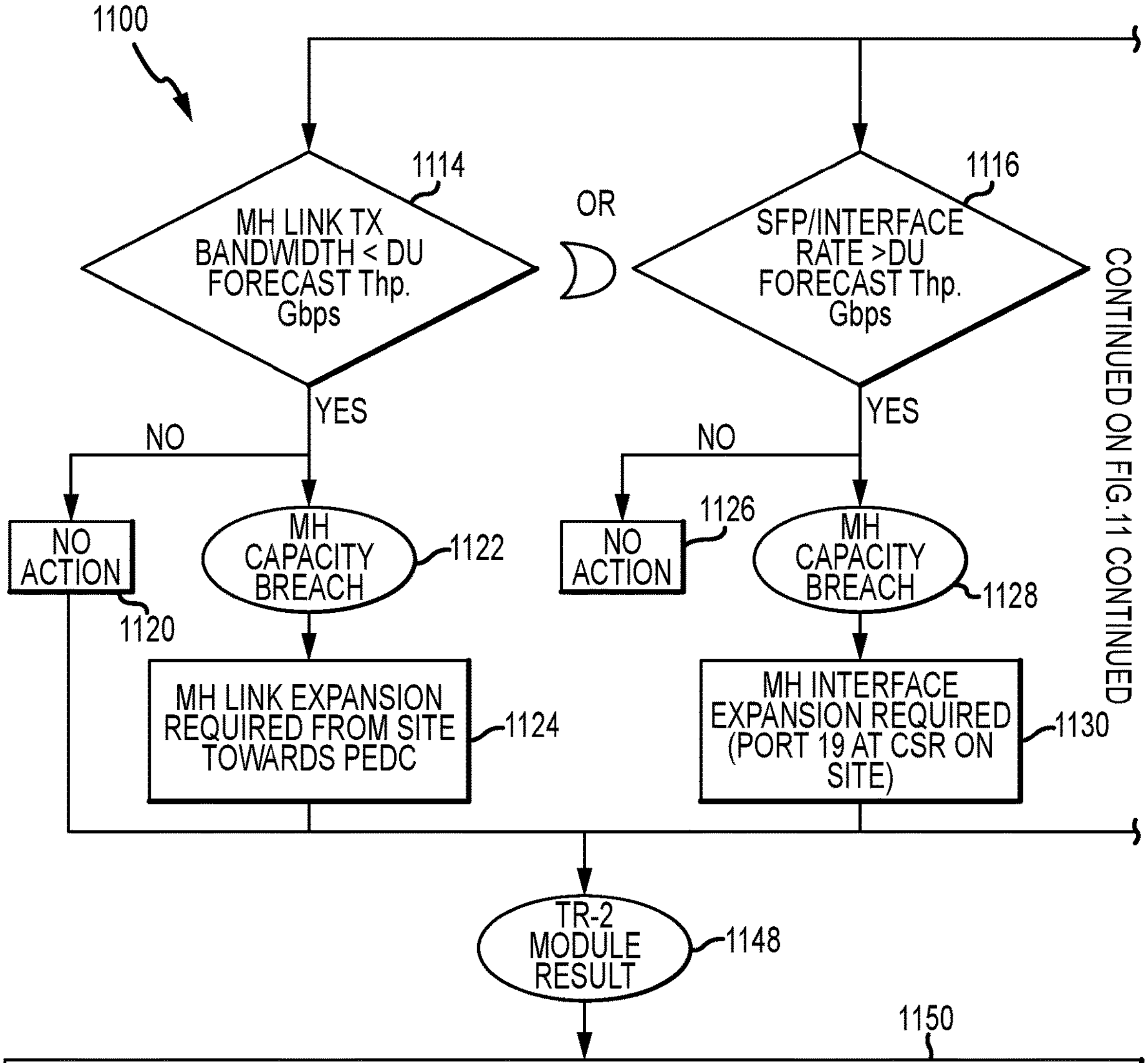
FIG. 11 illustrates an example process for detecting capacity breaches in main haul infrastructure of a cloud-based data and telephone network, in accordance with various embodiments.
Figure 11:
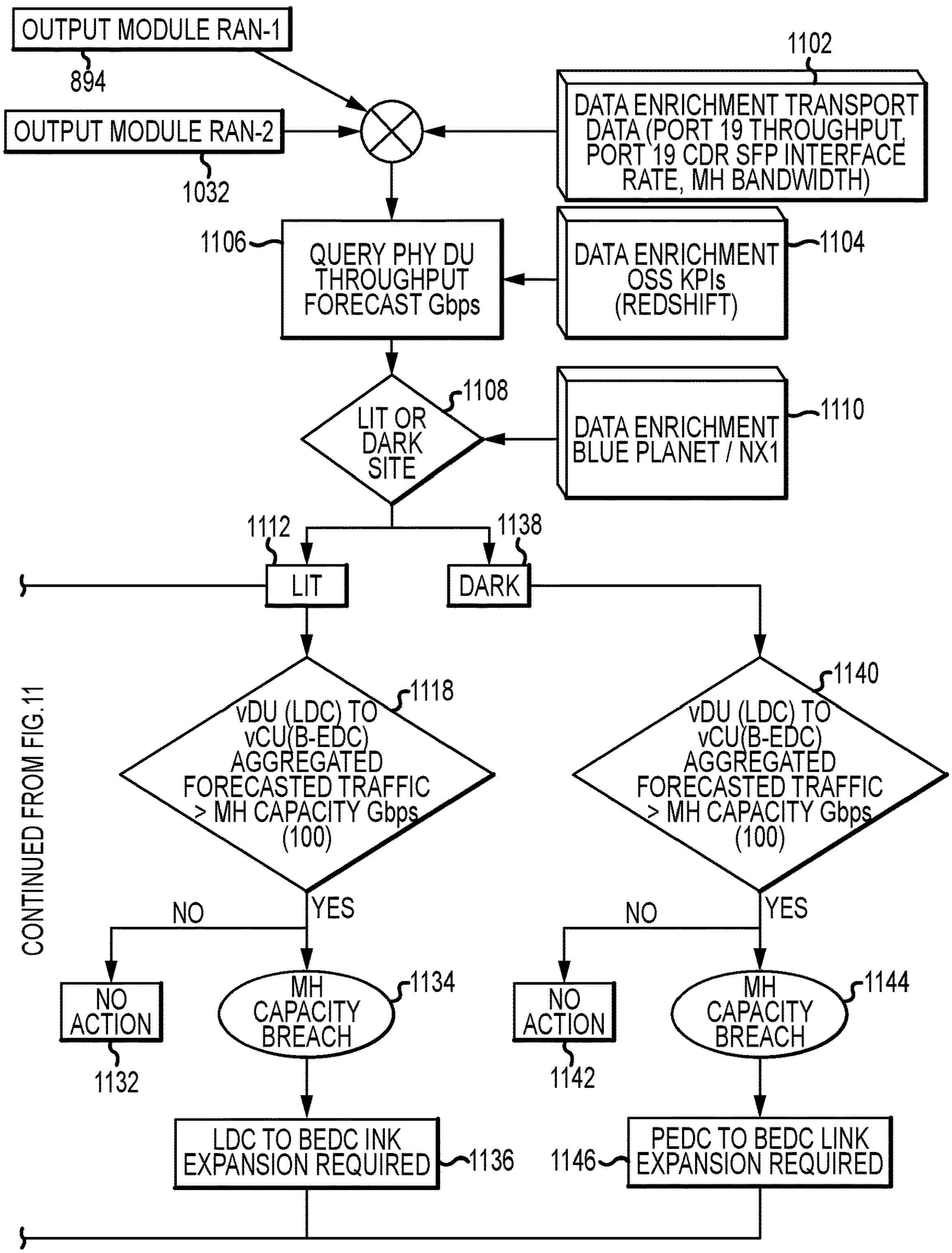

Referring now to FIG. 11, process 1100 is shown for projecting mid-haul capacity breaches, in accordance with various embodiments. Process 1100 can run in TR-2 module 708 of FIG. 7. The output 894 from the RAN-1 module and output 1034 from the RAN-2 module may be taken as an input to process 1100. Data enrichment 1102 can be performed with transport data. Transport data can include port 19 cell site router (CSR) throughput, port 19 CSR small formfactor pluggable (SFP) interface rate, and mid-haul bandwidth, for example.

In various embodiments, a CSR may be the router that routes the traffic from the cell site to a data center, and also within the site itself. Port 19 may connect the RU to the DU within the site, so the maximum capacity of port 19 can be compared with the traffic that flows from RU to DU. If the port capacity is limited, then the port may bottleneck traffic. Port 19 CSR SFP interface rate may be related to a small modular transceiver that plugs into an SFP port (e.g., the connection head that is plugged into port 19. The SFP may be checked to determine whether it has capacity limits, as the SFP capacity can impact traffic flow as well.

In various embodiments, process 1100 may query physical DU throughput forecast (Block 1106). Data enrichment 1110 may be performed on the query results using OSS KPIs, for example, using Redshift tools available on AWS (Block 1104).

In various embodiments, process 1100 may check whether the cell site is lit or dark (Block 1108). In determining whether the cell site is lit or dark, sites may be polled, network data may be queried, or other data sources may be used. As an example, lit or dark status may be queried using database tools such as NX1 or Blue Planet. In response to a site being lit (Block 1112), process 1100 checks whether mid-haul link transmission bandwidth is less than the forecast throughput for the DU (Block 1114). Mid-haul link transmission bandwidth being greater than the forecast throughput for the DU indicates a mid-haul capacity breach 1122. Capacity breach 1122 indicates a mid-haul expansion should be planned from the site towards the passthrough edge data center (PEDC) (Block 1124). Mid-haul link transmission bandwidth is greater than the forecast throughput for the DU indicates projections are within capacity and may not identify an action (Block 1120).

In various embodiments and in response to the site being lit, process 1100 may check whether the SFP/interface rate is greater than the forecast throughput for the DU (Block 1116). The SFP/interface rate being greater than the forecast throughput for the DU indicates mid-haul capacity breach 1128. Capacity breach 1128 indicates a mid-haul interface expansion 1130 (e.g., port 19 at CSR on site). The SFP/interface rate being less than the forecast throughput for the DU may indicate capacity is within acceptable thresholds and may not identify an action (Block 1126).

In various embodiments and in response to the site being lit, process 1100 may check whether the vDU (at an LDC) to vCU (at a B-EDC) aggregated forecast traffic is greater than the mid-haul capacity (Block 1118). Mid-haul capacity can be measured as a data rate such as, for example, 100 Gbps. Process 1100 may detect a mid-haul capacity breach 1134 in response to vDU to vCU aggregated forecast traffic being greater than the mid-haul capacity. Process 1100 identifies LDC to BEDC link expansion 1136 as a cure for mid-haul capacity breach 1134. Process 1100 may not identify an action (Block 1132) in response to vDU to vCU aggregated forecast traffic being less than the mid-haul capacity.

In various embodiments and in response to the site being dark (1138), process 1100 may check whether the vDU (at an LDC) to vCU (at a B-EDC) aggregated forecast traffic is greater than the mid-haul capacity (Block 1140). Mid-haul capacity can be measured as a data rate such as, for example, 100 Gbps. Process 1100 may detect a mid-haul capacity breach 1144 in response to vDU to vCU aggregated forecast traffic being greater than the mid-haul capacity. Process 1100 identifies PEDC to BEDC link expansion 1146 as a cure for mid-haul capacity breach 1144. Process 1100 may not identify an action (Block 1142) in response to vDU to vCU aggregated forecast traffic being less than the mid-haul capacity. Data regarding mid-haul capacity breaches 1122, 1128, 1134, 1144 are used in TR-2 module result 1148. Output 1150 of the TR-2 module may include a number of new links recommended and a number of expansion links recommended.

Figure 12A:
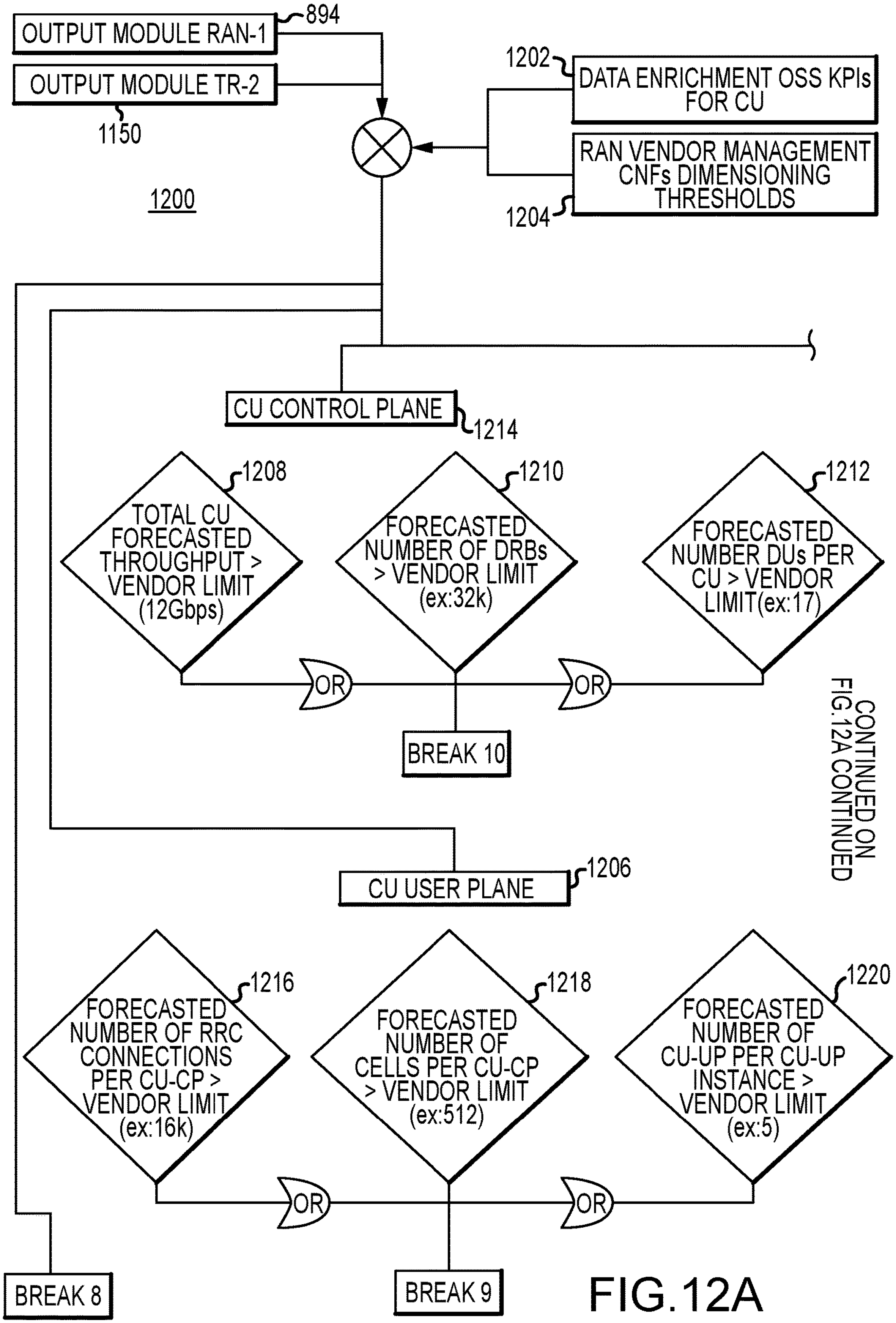
FIGS. 12A-12B illustrates an example process for detecting capacity breaches related to central units of a cloud-based data and telephone network, in accordance with various embodiments.
Figure 12A:
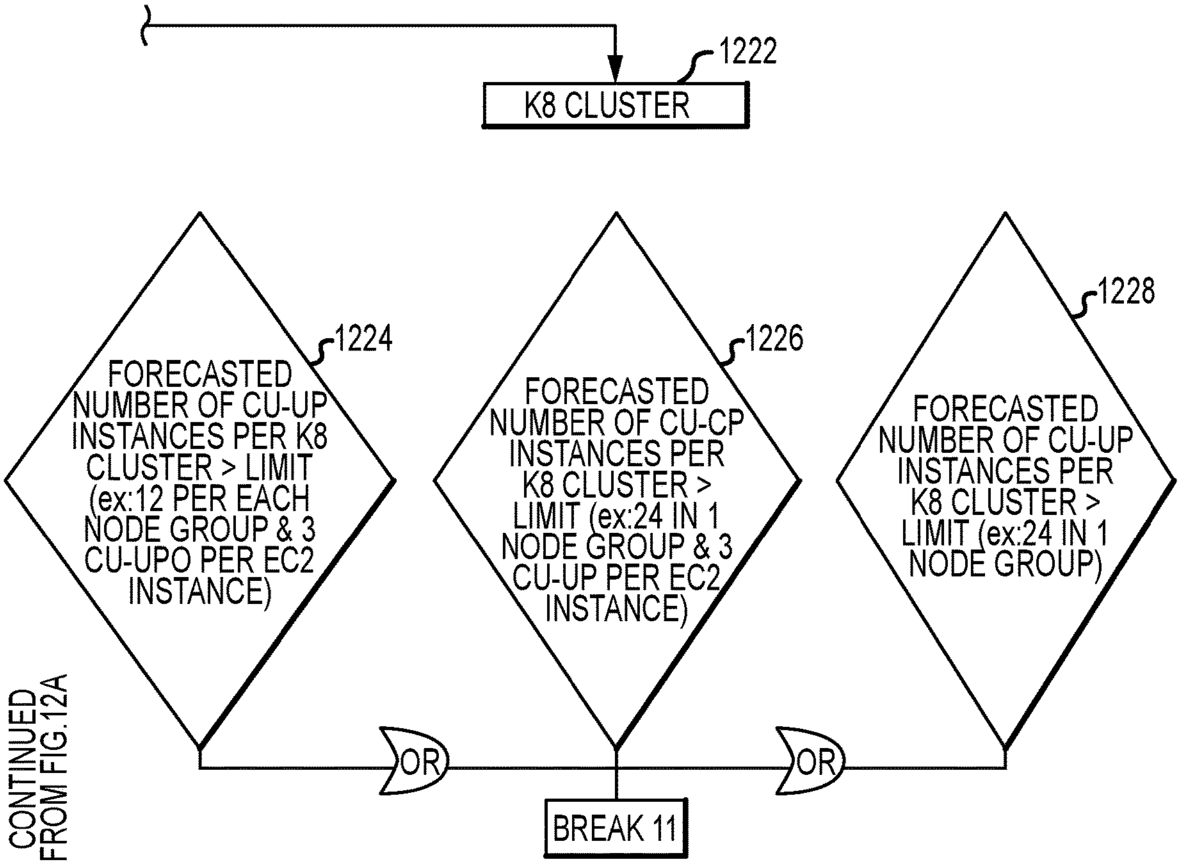
Figure 12B:
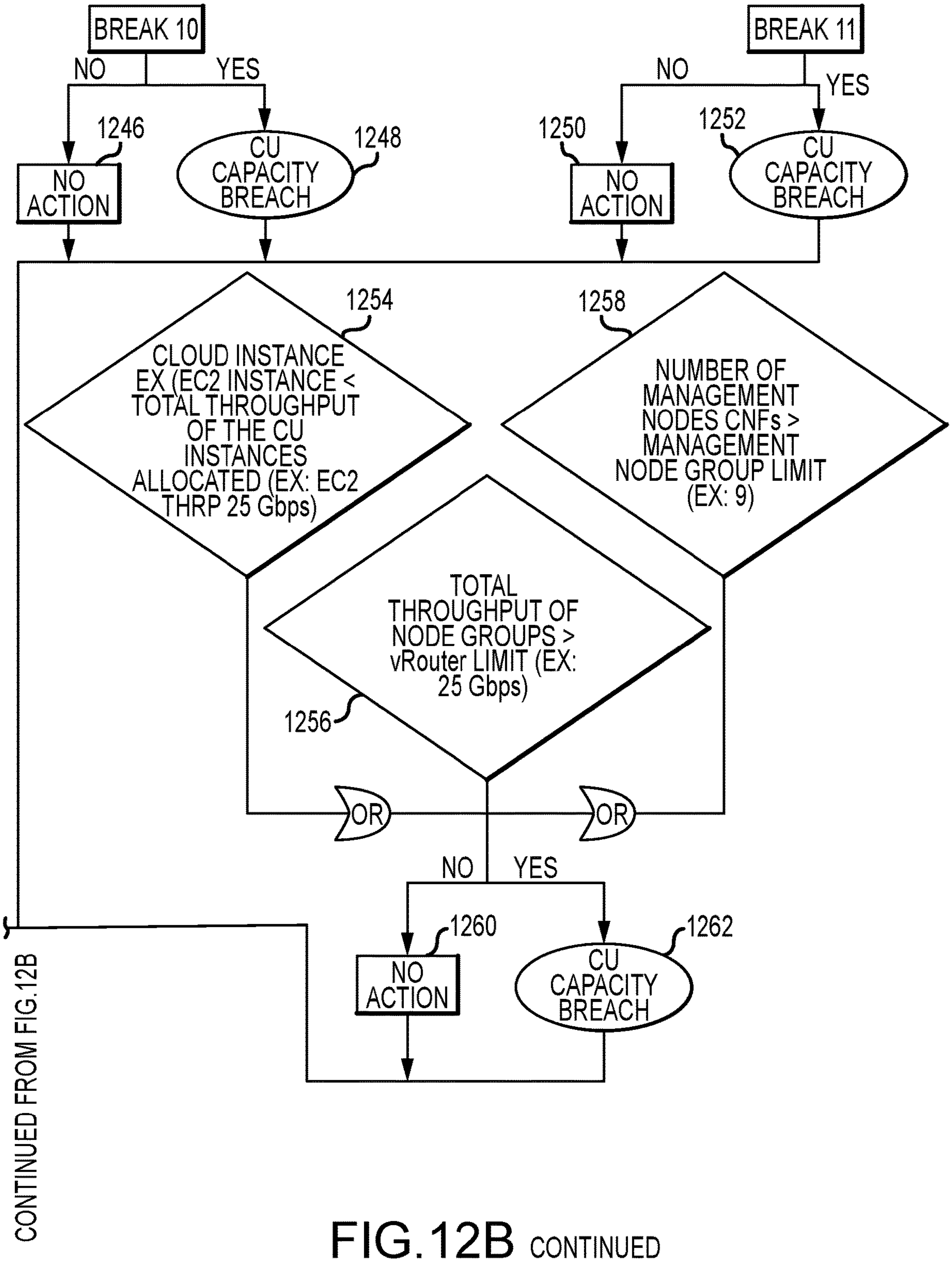

With reference to FIGS. 12A and 12B, process 1200 is shown for projecting CU capacity, in accordance with various embodiments. Process 1200 can run in RAN-3 module 710 of FIG. 7. Process 1200 may take output 894 from RAN-1 and output 1150 from TR-2 as inputs. Data enrichment may be performed with OSS KPIs for the CU (Block 1202). Data enrichment on input data may also be performed with RAN vendor management of cloud network function (CNF) dimensioning thresholds (Block 1204).

In various embodiments, process 1200 may check capacity of CU user plane (CU-CP) 1206 by comparing various performance metrics to thresholds. Process 1200 may determine whether the total CU forecast throughput is greater than the RAN vendor's throughput limit (Block 1208). The RAN vendor may set internal throughput limits such as, for example, approximately 12 Gbps. Process 1200 may identify CU capacity breach 1244 in response to determining total CU forecast throughput is greater than the vendor's throughput limit.

Process 1200 may determine whether the forecast number of DRBs is greater than the RAN vendor's limit (Block 1210). The RAN vendor may set internal DRB limits such as, for example, approximately 32,000 DRBs. Process 1200 may identify CU capacity breach 1244 in response to determining the forecast number of DRBs is greater than the RAN vendor's limit. Process 1200 may determine whether the number of DUs per CU is greater than the RAN vendor's limit (Block 1212). The RAN vendor may set internal DU to CU ratio limits such as, for example, approximately 17 DUs per CU. Process 1200 may identify CU capacity breach 1244 in response to determining the number of DUs per CU is greater than the RAN vendor's limit. Process 1200 may not identify a capacity breach and may not recommend an action in response to capacities being within threshold limits (Block 1242).

In various embodiments, process 1200 may check capacity of CU control plane 1214 (CU-CP) by comparing various performance metrics to thresholds. Process 1200 may determine whether the forecast number of RRC connections per CU-CP is greater than the RAN vendor's limit (Block 1216). The RAN vendor may set internal limits on the number of RRC connections per CU-CP such as, for example, approximately 16,000. Process 1200 may identify CU capacity breach 1248 in response to determining the forecast number of RRC connections per CU-CP is greater than the RAN vendor's limit.

Process 1200 may determine whether the forecast number of cells per CU-CP instance is greater than the RAN vendor's limit (Block 1218). The RAN vendor may set internal limits on the number of cells per CU-CP such as, for example, approximately 512. Process 1200 may identify CU capacity breach 1248 in response to determining the forecast number of cells per CU-CP instance is greater than the RAN vendor's limit.

Process 1200 may determine whether the forecast number of CU-UP per CU-CP instance is greater than the RAN vendor's limit (Block 1220). The RAN vendor may set internal limits on the number of CU-CP per CU-CP such as, for example, approximately 5. Process 1200 may identify CU capacity breach 1248 in response to determining the forecast number of CU-UP per CU-CP instance is greater than the RAN vendor's limit. Process 1200 may not identify a capacity breach and may not recommend an action in response to capacities being within threshold limits (Block 1246).

In various embodiments, process 1200 may check capacity of various types of container clusters 1222 by comparing various performance metrics to thresholds. Process 1200 may determine whether the forecast number of CU-UP (Group 1) instances per container cluster is greater than a threshold limit (Block 1224). In a Kubernetes-based container example running on AWS cloud infrastructure, the limits may be 12 instances per node group and 3 CU-UP per EC2 instance. Process 1200 may identify CU capacity breach 1252 in response to determining the forecast number of CU-CP instances per cluster is greater than a threshold.

Process 1200 may determine whether the forecast number of CU-UP (Group 2) instances per cluster is greater than a threshold (Block 1226). Various embodiments include two CU-UP node groups. Process 1200 may identify CU capacity breach 1252 in response to determining the forecast number of CU-CP instances per cluster is greater than a threshold (Block 1228). In a Kubernetes-based container example running on AWS cloud infrastructure, the limits may be 24 clusters in one node group and 3 CI-CP per EC2 instance.

In various embodiments, process 1200 may determine whether the cloud instance throughput is less than the total throughput of the CU instances allocated (Block 1254). In an example using AWS infrastructure, the cloud instance may be an EC2 instance with an example throughput of 25 Gbps. Process 1200 may identify CU capacity breach 1262 in response to determining the cloud instance throughput is less than the total throughput of the CU instances allocated.

In various embodiments, process 1200 may determine whether the total throughput of node instances is greater than the vRouter limit (Block 1256). In an example using AWS infrastructure, the vRouter may be virtualized networking infrastructure with an example capacity limit of 25 Gbps. Process 1200 may identify CU capacity breach 1262 in response to determining the total throughput of node instances is greater than the vRouter limit.

In various embodiments, process 1200 may determine whether the number of management nodes for CNFs is greater than the management node group limit (Block 1258). The management node group limit can be set to a number such as, for example, 9. Process 1200 may identify CU capacity breach 1262 in response to determining the number of management nodes CNFs is greater than the management node group limit. Process 1200 may not identify a capacity breach 1262 and may not recommend an action in response to capacities being within threshold limits (Block 1260).

In various embodiments, process 1200 may check capacity of RAN management functions 1230 by comparing various performance metrics to thresholds. Process 1200 may determine whether the forecast RUs, DUs, CUs per EMS instance are greater than a threshold (Block 1232). In a Mavenir based example, the limit per mCMS instance may be 150, 1500, 9000, or any other suitable constant. Process 1200 may identify CU capacity breach 1240 in response to determining the forecast RUs, DUs, CUs per EMS instance are greater than a threshold.

Process 1200 may determine whether the forecast number of DUs per OSS instance is greater than a capacity limit (Block 1234). In a Mavenir-based example, the limit per mCMS instance may be 150, 1,500, 9,000, or any other suitable constant. Process 1200 may identify CU capacity breach 1240 in response to determining the forecast number of DUs per OSS instance is greater than a capacity limit.

Process 1200 may determine whether the forecast number of RUs per configuration management function is greater than a threshold (Block 1236). In a Mavenir-based example, the limit of RUs per SDaaS may be 2,000, or any other suitable constant. Process 1200 may identify CU capacity breach 1240 in response to determining the forecast number of RUs per configuration management function is greater than a threshold. Process 1200 may not identify a capacity breach 1238 and may not recommend an action in response to capacities being within threshold limits (Block 1238).

Data regarding CU capacity breaches 1240, 1244, 1248, 1252, and 1262 are used in RAN-3 module result 1264. Output 1266 of the RAN-3 module may include a number of CU-UP breaching capacity limits, a number of container clusters breaching dimensioning limits, or other data for use in a corrective recommendation for capacity expansion.

The System tends to anticipate and avoid capacity and quality issues that may be associated with a rapidly-growing data and telephone network. Capacity breaches result in recommended hardware and software expansions to the network at all levels to cure projected deficiencies. The System takes into account cloud-computing infrastructure and cell site infrastructure to holistically diagnose and anticipate capacity shortcomings on the network.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A process for detecting capacity breaches in an area of interest (AOI) of a radio access network (RAN), the process comprising:

querying data for cells in the RAN network over a sampling period to retrieve hourly-traffic data for the cells;

remove outliers from the hourly-traffic data for the cells to generate trimmed hourly-traffic data for the cells;

identifying, in the trimmed hourly-traffic data, top-download-traffic hours on different days in the sampling period for each of the cells;

aggregating the trimmed hourly-traffic data for each of the cells at the top-download-traffic hours to generate busy-hour indicators for each of the cells and busy-hour indicators for sectors associated with cells;

extrapolating the busy-hour indicators using subscriber growth in the AOI to generate forecast indicators for each of the cells and for the sectors associated with the cells; and comparing the forecast indicators to capacity thresholds to forecast capacity breaches.

2. The process of claim 1, further comprising identifying a new cell site for construction in the AOI in response to forecasting a sector capacity breach.

3. The process of claim 2, further comprising:

identifying a throughput capacity of a fronthaul link from a location of the new cell site towards a data center in response to identifying the new cell site for construction; and forecasting a fronthaul capacity breach in response to the throughput capacity of the fronthaul link from the location of the new cell site towards the data center being less than a throughput capacity of a virtual distributed unit at the data center.

4. The process of claim 3, further comprising identifying a link for expansion in response to forecasting the fronthaul capacity breach.

5. The process of claim 1, further comprising:

identifying a throughput capacity of a physical link at a live cell site in response to forecasting a capacity breach at the live cell site; and forecasting a fronthaul capacity breach in response to the throughput capacity of the physical link being less than a throughput capacity of a distributed unit.

6. The process of claim 5, further comprising identifying a new link for construction in response to forecasting the fronthaul capacity breach.

7. The process of claim 1, further comprising:

identifying a transmission bandwidth of a mid-haul link in response to forecasting a capacity breach at a live cell site; and forecasting a mid-haul capacity breach in response to the transmission bandwidth of the mid-haul link being greater than a throughput capacity of a distributed unit.

8. The process of claim 7, further comprising identifying an expansion of the mid-haul link in response to forecasting the mid-haul capacity breach.

9. The process of claim 1, further comprising:

identifying an interface rate of a mid-haul link in response to forecasting a capacity breach at a live cell site; and forecasting a mid-haul capacity breach in response to the interface rate of the mid-haul link being less than a throughput capacity of a distributed unit.

10. The process of claim 9, further comprising identifying an interface expansion of the mid-haul link in response to forecasting the mid-haul capacity breach.

11. The process of claim 1, further comprising:

forecasting a traffic between a virtual distributed unit (vDU) running at a first data center and a virtual central unit (vCU) running at a second data center in response to forecasting a capacity breach at a live cell site or at a planned cell site; and forecasting a mid-haul capacity breach in response to the traffic between the vDU and the vCU being greater a mid-haul capacity.

12. The process of claim 11, further comprising identifying an expansion of a mid-haul link between the first data center and the second data center in response to forecasting the mid-haul capacity breach.

13. The process of claim 1, wherein aggregating the trimmed hourly-traffic data for each of the cells at the top-download-traffic hours further comprises averaging the trimmed hourly-traffic data for each of the cells at the top-download-traffic hours.

14. A process for detecting capacity breaches in an area of interest (AOI) of a radio access network (RAN), the process comprising:

generating performance indicators for a cells and sectors comprising the cells;

extrapolating the performance indicators using a subscriber growth model to generate forecast indicators for the cells and for the sectors comprising the cells;

comparing the forecast indicators to capacity thresholds to forecast a sector break at a cell site;

identifying a new cell site for construction in the AOI in response to forecasting the sector break;

identifying a throughput capacity of a fronthaul link from a location of the new cell site towards a data center in response to identifying the new cell site for construction; and forecasting a fronthaul capacity breach in response to the throughput capacity of the fronthaul link being less than a throughput capacity of a virtual distributed unit (vDU) at the data center.

15. The process of claim 14, further comprising identifying a link for expansion in response to forecasting the fronthaul capacity breach.

16. The process of claim 14, further comprising:

identifying a throughput capacity of a physical link at the cell site in response to forecasting the sector break at the cell site; and forecasting a fronthaul capacity breach in response to the throughput capacity of the physical link being less than a throughput capacity of a distributed unit; and identifying a new link for construction in response to forecasting the fronthaul capacity breach.

17. The process of claim 14, further comprising:

identifying a transmission bandwidth of a mid-haul link in response to forecasting the sector break at the cell site; and forecasting a mid-haul capacity breach in response to the transmission bandwidth of the mid-haul link being greater than a throughput capacity of a distributed unit; and identifying an expansion of the mid-haul link in response to forecasting the mid-haul capacity breach.

18. The process of claim 14, further comprising:

forecasting a traffic between a virtual distributed unit (vDU) running at a first data center and a virtual central unit (vCU) running at a second data center in response to forecasting the sector break at the cell site;

forecasting a mid-haul capacity breach in response to the traffic between the vDU and the vCU being greater a mid-haul capacity; and identifying an expansion of a mid-haul link between the first data center and the second data center in response to forecasting the mid-haul capacity breach.

* * * * *